US012734821B2

(12) United States Patent
Murasawa

(10) Patent No.: US 12,734,821 B2
(45) Date of Patent: Sep. 15, 2026

(54) INFORMATION PROCESSING APPARATUS, METHOD, AND STORAGE MEDIUM STORING PROGRAM

(71) Applicant: CANON KABUSHIKI KAISHA, Tokyo (JP)

(72) Inventor: Kouta Murasawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 338 days.

(21) Appl. No.: 18/180,553

(22) Filed: Mar. 8, 2023

(65) Prior Publication Data

US 2023/0294415 A1 Sep. 21, 2023

(30) Foreign Application Priority Data

Mar. 18, 2022 (JP) ................................ 2022-044384

(51) Int. Cl.
*B41J 2/21* (2006.01)

(52) U.S. Cl.
CPC .................................. *B41J 2/2132* (2013.01)

(58) Field of Classification Search
CPC ...................................................... B41J 2/2132
See application file for complete search history.

(56) References Cited

U.S. PATENT DOCUMENTS 9,533,492 B2 1/2017 Murasawa
9,815,274 B2 11/2017 Murasawa
2019/0014227 A1* 1/2019 Tanase .............. H04N 1/00188
2023/0161527 A1 5/2023 Suzuki

FOREIGN PATENT DOCUMENTS

JP 2004291510 A * 10/2004
JP 2008-108420 A 5/2008
JP 2019-31024 A 2/2019
JP 2020-90061 A 6/2020
WO 2018/139272 A1 8/2018

OTHER PUBLICATIONS

Murakami, MachinetranslationofJP-2004291510-A, 2004 (Year: 2004).*
Japanese Office Action issued Jan. 19, 2026 during prosection of corresponding Japanese Application No. 2022-044384 (English language machine translaiton included).

* cited by examiner

*Primary Examiner* — Scott A Richmond
(74) *Attorney, Agent, or Firm* — VENABLE LLP

(57) ABSTRACT

An information processing apparatus includes a changing unit configured to change an arrangement of pixels which are decided from the first ink data and in which the first ink is printed and the number of dots of the first ink in each pixel, based on the arrangement of pixels which are decided from the first ink data and in which the first ink is printed, and an arrangement of pixels which are decided from the second ink data and in which the second ink is printed.

12 Claims, 12 Drawing Sheets

FIG. 8A

FLUORESCENT INK AMOUNT

| | | | |
|---|---|---|---|
| 10 | 10 | 10 | 10 |
| 10 | 10 | 10 | 10 |
| 10 | 10 | 10 | 10 |
| 10 | 10 | 10 | 10 |

FIG. 8B

FLUORESCENT INK QUANTIZED VALUE

| | | | |
|---|---|---|---|
| 1 | 1 | 0 | 1 |
| 0 | 1 | 1 | 0 |
| 1 | 0 | 1 | 0 |
| 1 | 1 | 0 | 1 |

FIG. 8C

CYAN QUANTIZED VALUE

| | | | |
|---|---|---|---|
| 1 | 1 | 0 | 1 |
| 0 | 1 | 0 | 1 |
| 1 | 1 | 1 | 0 |
| 1 | 0 | 1 | 0 |

FIG. 8D

THRESHOLD MASK

| | | | |
|---|---|---|---|
| 1 | 6 | 11 | 3 |
| 12 | 2 | 7 | 15 |
| 8 | 14 | 4 | 13 |
| 10 | 5 | 16 | 9 |

FIG. 8E

FLUORESCENT INK DOT GENERATION FLAG

| | | | |
|---|---|---|---|
| 0 | 0 | 1 | 0 |
| 1 | 0 | 1 | 0 |
| 0 | 0 | 0 | 1 |
| 0 | 1 | 0 | 1 |

FIG. 8F

FLUORESCENT INK

| | | | |
|---|---|---|---|
| 0 | 0 | 2 | 0 |
| 1 | 0 | 2 | 0 |
| 0 | 0 | 0 | 1 |
| 0 | 2 | 0 | 2 |

FIG. 9A

| FLUORESCENCE:75% | | | | CYAN:50% | | | |
|---|---|---|---|---|---|---|---|
| 1 | 1 | 1 | 1 | 0 | 1 | 0 | 1 |
| 0 | 1 | 0 | 1 | 1 | 0 | 1 | 0 |
| 1 | 1 | 1 | 1 | 0 | 1 | 0 | 1 |
| 0 | 1 | 0 | 1 | 1 | 0 | 1 | 0 |

FIG. 9B

| FLUORESCENCE:75% | | | | CYAN:75% | | | |
|---|---|---|---|---|---|---|---|
| 1 | 1 | 1 | 1 | 0 | 1 | 0 | 1 |
| 0 | 1 | 0 | 1 | 1 | 1 | 1 | 1 |
| 1 | 1 | 1 | 1 | 0 | 1 | 0 | 1 |
| 0 | 1 | 0 | 1 | 1 | 1 | 1 | 1 |

FIG. 9C

| FLUORESCENCE:50% | | | | CYAN:50% | | | |
|---|---|---|---|---|---|---|---|
| 1 | 0 | 1 | 0 | 0 | 1 | 0 | 1 |
| 0 | 1 | 0 | 1 | 1 | 0 | 1 | 0 |
| 1 | 0 | 1 | 0 | 0 | 1 | 0 | 1 |
| 0 | 1 | 0 | 1 | 1 | 0 | 1 | 0 |

FIG. 9D

| FLUORESCENCE:50% | | | | CYAN:75% | | | |
|---|---|---|---|---|---|---|---|
| 1 | 0 | 1 | 0 | 0 | 1 | 0 | 1 |
| 0 | 1 | 0 | 1 | 1 | 1 | 1 | 1 |
| 1 | 0 | 1 | 0 | 0 | 1 | 0 | 1 |
| 0 | 1 | 0 | 1 | 1 | 1 | 1 | 1 |

FIG. 10A

| FLUORESCENCE:75% | | | | CYAN:50% | | | |
|---|---|---|---|---|---|---|---|
| 2 | 0 | 2 | 0 | 0 | 1 | 0 | 1 |
| 0 | 1 | 0 | 1 | 1 | 0 | 1 | 0 |
| 2 | 0 | 2 | 0 | 0 | 1 | 0 | 1 |
| 0 | 1 | 0 | 1 | 1 | 0 | 1 | 0 |

FIG. 10B

| FLUORESCENCE:75% | | | | CYAN:75% | | | |
|---|---|---|---|---|---|---|---|
| 3 | 0 | 3 | 0 | 0 | 1 | 0 | 1 |
| 0 | 0 | 0 | 0 | 1 | 1 | 1 | 1 |
| 3 | 0 | 3 | 0 | 0 | 1 | 0 | 1 |
| 0 | 0 | 0 | 0 | 1 | 1 | 1 | 1 |

FIG. 10C

| FLUORESCENCE:50% | | | | CYAN:50% | | | |
|---|---|---|---|---|---|---|---|
| 1 | 0 | 1 | 0 | 0 | 1 | 0 | 1 |
| 0 | 1 | 0 | 1 | 1 | 0 | 1 | 0 |
| 1 | 0 | 1 | 0 | 0 | 1 | 0 | 1 |
| 0 | 1 | 0 | 1 | 1 | 0 | 1 | 0 |

FIG. 10D

| FLUORESCENCE:50% | | | | CYAN:75% | | | |
|---|---|---|---|---|---|---|---|
| 2 | 0 | 2 | 0 | 0 | 1 | 0 | 1 |
| 0 | 0 | 0 | 0 | 1 | 1 | 1 | 1 |
| 2 | 0 | 2 | 0 | 0 | 1 | 0 | 1 |
| 0 | 0 | 0 | 0 | 1 | 1 | 1 | 1 |

INFORMATION PROCESSING APPARATUS, METHOD, AND STORAGE MEDIUM STORING PROGRAM

BACKGROUND OF THE INVENTION

Field of the Invention

The present invention relates to an information processing apparatus for processing data to be used in printing performed by ejecting ink on a print medium, a method, and a storage medium storing a program.

Description of the Related Art

A printing apparatus for printing an image by using ink that emits fluorescence (to be referred to as "fluorescent ink" hereinafter) and ink that emits no fluorescence (to be referred to as "non-fluorescent ink" hereinafter) is known. A printing apparatus like this can print a fluorescent image having high color saturation by using the fluorescent ink. A fluorescent image having high color saturation is highly attractive and hence is used as, for example, a poster and Point Of Purchase advertising (POP advertising) for use in in-store promotion of a retail store.

International Publication No. 2018/139272 describes a method in which, when performing printing by using fluorescent ink and non-fluorescent ink, the color development of an image to be printed by using the fluorescent ink is improved by controlling the ink amount and the drop landing order of each pass of the fluorescent ink and the non-fluorescent ink. More specifically, International Publication No. 2018/139272 describes a method of controlling the ink amount of each pass of the fluorescent ink and the non-fluorescent ink, such that the fluorescent ink is printed on the non-fluorescent ink on a print medium.

SUMMARY OF THE INVENTION

The present invention provides an information processing apparatus for appropriately deciding the arrangement of pixels in which a plurality of types of inks having different spectral characteristics are printed, a method, and a storage medium storing a program.

The present invention in one aspect provides an information processing apparatus including: an acquisition unit configured to acquire print data; a generation unit configured to generate first ink data for performing printing by first ink, and second ink data for performing printing by second ink having a spectral characteristic different from a spectral characteristic of the first ink, based on the print data acquired by the acquisition unit; and a changing unit configured to change an arrangement of pixels which are decided from the first ink data and in which the first ink is printed and the number of dots of the first ink in each pixel, based on the arrangement of pixels which are decided from the first ink data and in which the first ink is printed, and an arrangement of pixels which are decided from the second ink data and in which the second ink is printed, wherein the changing unit changes the arrangement of pixels in which the first ink is printed, such that a pixel in which the first ink is printed and a pixel in which the second ink is printed do not overlap each other, and the changing unit changes the number of dots in each pixel of the first ink, such that the total number of dots of the first ink decided from the first ink data is maintained before and after the change by the changing unit.

According to the present invention, it is possible to properly decide the arrangement of pixels in which a plurality of types of inks having different spectral characteristics are printed.

Further features of the present invention will become apparent from the following description of exemplary embodiments with reference to the attached drawings.

BRIEF DESCRIPTION OF THE DRAWINGS

FIGS. 8A to 8F are views for explaining examples of a 4×4 pixel region;

FIGS. 9A to 9D are views for explaining examples of a 4×4 pixel region;

FIGS. 10A to 10D are views for explaining examples of a 4×4 pixel region;

DESCRIPTION OF THE EMBODIMENTS

Figure 1:
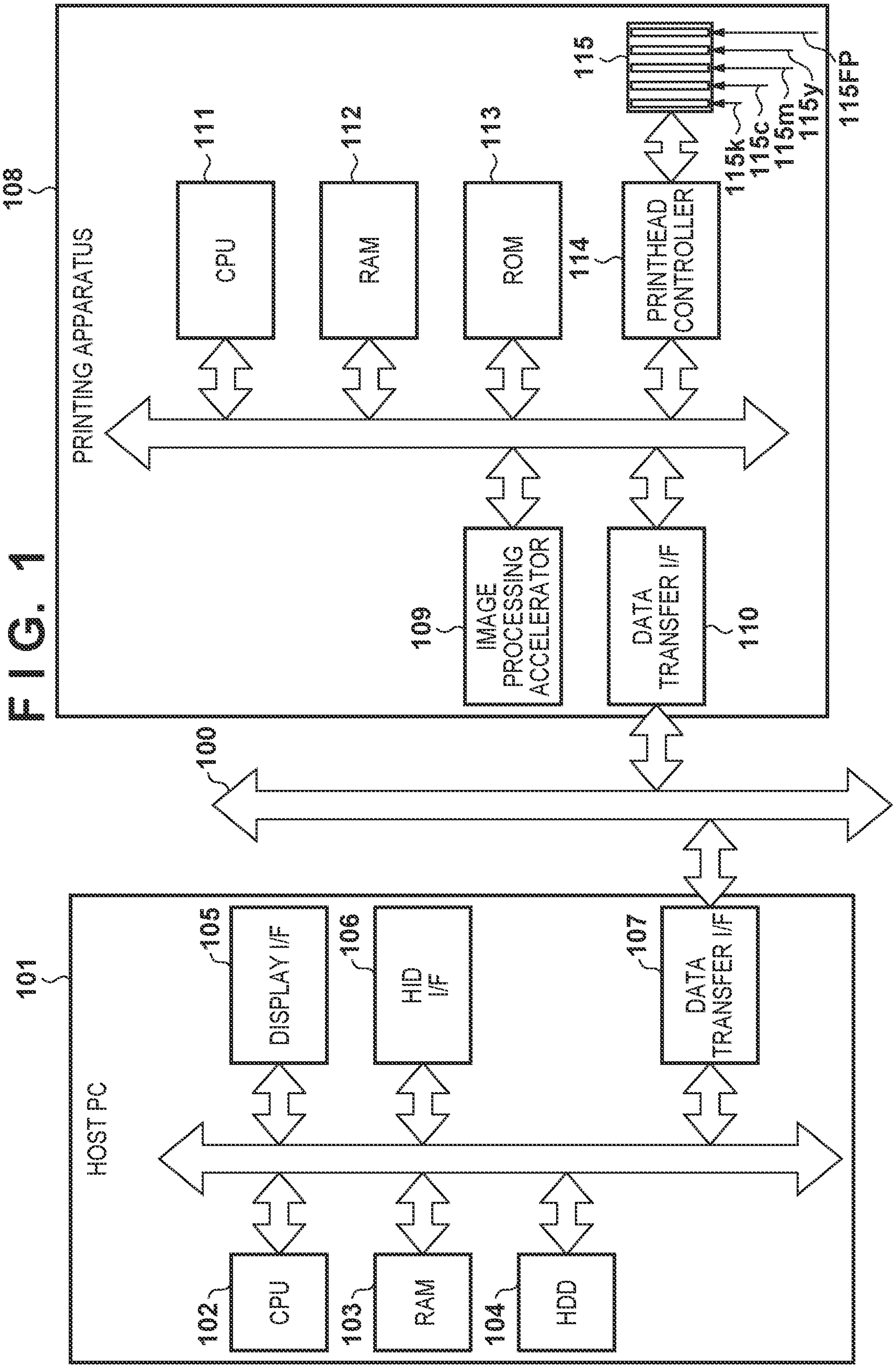
FIG. 1 is a block diagram showing the configuration of a printing system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

When dots of a plurality of types of inks having different spectral characteristics overlap each other, the color development of the inks is obstructed in some cases. The result is the possibility that a color change occurs in a color gamut to be reproduced by the combination of these inks and decreases the color quality.

According to this disclosure, it is possible to appropriately decide the arrangement of pixels in which a plurality of types of inks having different spectral characteristics are printed.

First Embodiment

Terms to be used in this embodiment are defined as follows.

(Printing)

"Printing" means the formation of both significant information such as characters and figures and insignificant information. "Printing" represents the formation of images, designs, patterns, and the like on a print medium, regardless of whether they are actualized so as to be visually perceivable by humans. Alternatively, "printing" represents a case in which a print medium is processed.

(Print Medium)

"Print medium" represents not only paper used in general printing apparatuses, but also materials capable of absorbing ink, such as cloth, plastic films, metal plates, glass, ceramics, woods, and leather.

(Ink)

"Ink" should widely be interpreted like the above definition of "printing". "Ink" represents a medium that forms images, designs, patterns, and the like when applied on a print medium, or a medium that processes a print medium when applied on the print medium, or a medium containing a printing material usable in an ink treatment. Note that the ink treatment means, for example, coagulation or insolubilization of a coloring agent contained in ink to be applied on a print medium.

(Nozzle)

"Nozzle" represents an ejection port of a printhead unless otherwise specified. Fluid passages communicating with each other and an element that generates energy to be used in ink ejection are formed inside the nozzle.

(Scan)

A printhead performs printing on a print medium by scanning the print medium. "Scan" means the movement of the printhead while the printhead is accelerating/decelerating in order to perform printing or in relation to printing.

(Reciprocal Printing)

"Reciprocal printing" represents printing that is performed by reciprocally moving a printhead on the surface of a print medium. Reciprocal scan, reciprocal printing, bidirectional scan, and bidirectional printing represent the same definition.

(Color Reproduction Region)

"Color reproduction region" is also called a color reproduction range, a color gamut, or a gamut. Generally, "color reproduction region" indicates the range of colors reproducible in a given color space. Also, a gamut volume is an index representing the extent of this color reproduction range. The gamut volume is a three-dimensional volume in a given color space. Chromaticity points forming the color reproduction range are sometimes discrete. For example, a specific color reproduction range is represented by 729 points on CIE-L*a*b*, and points between them are obtained by using a well-known interpolating operation such as tetrahedral interpolation or cubic interpolation. In this case, as the corresponding gamut volume, it is possible to use a volume obtained by calculating the volumes on CIE-L*a*b* of tetrahedrons or cubes forming the color reproduction range and accumulating the calculated volumes, in accordance with the interpolating operation method. The color reproduction region and the color gamut in this embodiment are not limited to a specific color space. In this embodiment, however, a color reproduction range in the CIE-L*a*b* space will be explained as an example. Also, the numerical value of a color reproduction range in this embodiment indicates a volume obtained by accumulation in the CIE-L*a*b* on the premise of tetrahedral interpolation.

<Whole Printing System>

FIG. 1 is a block diagram showing the configuration of a printing system according to this embodiment. APC 101 is a versatile information processing apparatus such as a PC, and, for example, a host PC or a tablet PC is used. A CPU 102 comprehensively controls the PC 101 by reading out a program stored in an HDD 104 to a RAM 103 as a work area and executing the readout program. For example, the CPU 102 acquires a command from the user via aHuman Interface Device (HID) I/F 106 or a touch panel (not shown). Then, based on the acquired command or the program stored in the HDD 104, the PC 101 generates print data processable in a printing apparatus 108 and transfers the data to the printing apparatus 108. Also, the CPU 102 performs predetermined processing such as conversion of a data format on print data acquired from the printing apparatus 108 via a data transfer I/F 107, in accordance with the program stored in the HDD 104. Based on the result of the predetermined processing, the CPU 102 displays the result on a display (not shown) via a display I/F 105.

In the printing apparatus 108, a CPU 111 reads out a program stored in a ROM 113 to a RAM 112 as a work area and executes the readout program, thereby comprehensively controlling the printing apparatus 108. An image processing accelerator 109 is hardware capable of executing image processing faster than the CPU 111. The image processing accelerator 109 is activated when the CPU 111 writes a parameter and data necessary for image processing at a predetermined address of the RAM 112. The image processing accelerator 109 loads the abovementioned parameter and data, and executes image processing on the data. It is also possible to execute equal processing by the CPU 111, instead of the image processing accelerator 109. The abovementioned parameter can be stored in the ROM 113, and can also be stored in a storage (not shown) such as a flash memory or an HDD.

Image processing to be performed by the CPU 111 or the image processing accelerator 109 will be explained below. This image processing is, for example, a process of generating data indicating the dot formation position of ink in each scan by a printhead 115, based on acquired print data. The CPU 111 or the image processing accelerator 109 performs a color conversion process and a quantization process on the acquired print data.

The color conversion process is a process of performing color conversion to ink concentrations to be used in the printing apparatus 108. For example, the acquired print data contains image data indicating an image and fluorescent data for performing fluorescent printing. In a case where the image data is data indicating an image in a color space coordinate system such as sRGB as the expression colors of a monitor, data indicating an image by color coordinates (R, G, B) of the sRGB is converted into non-fluorescent ink data (CMYK to be described later) to be handled by the printing apparatus 108. Alternatively, the data is converted into ink data (CMYKF to be described later) containing a fluorescent ink color to be handled by the printing apparatus 108. Fluorescent data is converted into fluorescent ink data. Furthermore, if there are both data indicating an image by color coordinates (R, G, B) of the sRGB and fluorescent data, they are converted into both non-fluorescent ink data (CMYK) and fluorescent ink data. Alternatively, these data are converted into both ink data (CMYKF) containing a fluorescent ink color and fluorescent ink data. In this case, two planes of fluorescent ink data are generated. The color conversion method is implemented by, for example, matrix operation processing or processing using a three-dimensional Look-Up Table (LUT) or a four-dimensional LUT.

As an example, the printing apparatus 108 of this embodiment uses inks of black (K), cyan (C), magenta (M), yellow (Y), and fluorescence (F). Therefore, image data and fluorescent data of an RGB signal are converted into image data formed by 8-bit color signals of K, C, M, Y, and F. The color signal of each color corresponds to the application amount of each ink. In this embodiment, the ink colors are five colors, that is, K, C, M, Y, and F, as examples. However, it is also possible to use other ink colors such as inks of light cyan (Lc), light magenta (Lm), and gray (Gy) having low concentrations. In this case, ink data corresponding to these ink colors is generated. In this embodiment, inks of light cyan (Lc), light magenta (Lm), and gray (Gy) will also be explained as non-fluorescent inks. In addition, achromatic-color inks such as black (K) and gray (Gy) will also be explained as non-fluorescent inks.

After the color conversion process, a quantization process is performed on the ink data. This quantization process is a process of decreasing the number of levels of the gray scale of the ink data. In this embodiment, quantization is performed by using a dither matrix in which threshold values to be compared with the values of the ink data are arrayed in individual pixels. Finally, binary data indicating whether to form a dot in each dot formation position is generated.

After the image processing is performed, a printhead controller 114 transfers the binary data to the printhead 115. At the same time, the CPU 111 performs printing control via the printhead controller 114, so as to operate a carriage motor for driving the printhead 115, and to operate a conveyor motor for conveying a print medium. The printhead 115 scans the print medium and ejects ink droplets onto the print medium, thereby forming an image on the print medium.

When performing printing by a plurality of scans, a scan order deciding process is performed after predetermined image processing is performed. The scan order deciding process is a process of thinning an image by using a mask pattern or the like on the quantized data in order to generate data corresponding to each scan. This process can be accelerated by using the image processing accelerator 109.

A communication line 100 connects the PC 101 and the printing apparatus 108. In this embodiment, a Local Area Network (LAN) will be explained as an example of the communication line 100. However, the connection may also be obtained by using, for example, a USB hub, a wireless communication network using wireless access points, or a Wifi direct communication function. In addition, at least a partial block of the printing apparatus 108 can be configured by the PC 101, or the individual blocks of the PC 101 and the printing apparatus 108 can be implemented as one device.

An explanation will be made by assuming that the printhead 115 has a total of five print nozzle arrays for four color inks of cyan (C), magenta (M), yellow (Y), and black (K), and one fluorescent ink of fluorescent pink (FP). The fluorescent ink may also be fluorescent read (FR), fluorescent yellow (FY), fluorescent green (FG), or fluorescent blue (FB), instead of fluorescent pink.

<Printhead of Printing Apparatus>

Figure 2:
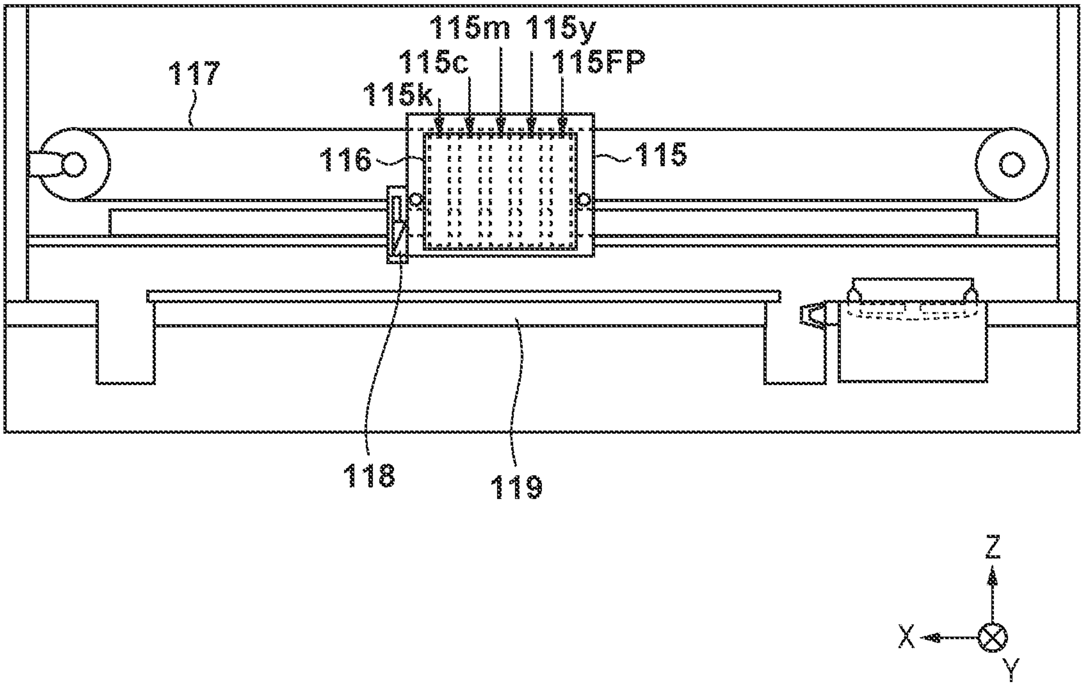
FIG. 2 is a view for explaining a printhead.

FIG. 2 is a view for explaining the printhead 115. In this embodiment, an image is printed on a unit region for one nozzle array by performing scan N times. The printhead 115 has a carriage 116, nozzle arrays 115*k*, 115*c*, 115*m*, 115*y*, and 115FP, and an optical sensor 118. The nozzle arrays 115*k*, 115*c*, 115*m*, 115*y*, and 115FP respectively correspond to black, cyan, magenta, yellow, and fluorescent pink. The carriage 116 on which the five nozzle arrays 115*k*, 115*c*, 115*m*, 115*y*, and 115FP and the optical sensor 118 are mounted can reciprocally move along the X direction (a main scan direction) in FIG. 2 by the driving force of a carriage motor transmitted via a belt 117. While the carriage 116 is moving in the X direction relative to a print medium, each nozzle of the nozzle arrays ejects ink droplets in the gravity direction (the −Z direction in FIG. 2) based on print data. Consequently, an image of 1/N-time main scan is printed on the print medium placed on a platen 119. When one-time main scan is complete, the print medium is conveyed along a conveyance direction (the −Y direction in FIG. 2) crossing the main scan direction by a distance corresponding to the width of the 1/N-time main scan. These operations print an image having the width of one nozzle array by N-time scans. An image is gradually formed on the print medium by alternately repeating the main scan and the conveyance operation as described above. Image printing in a predetermined region is completed by the control as described above.

Figure 5:
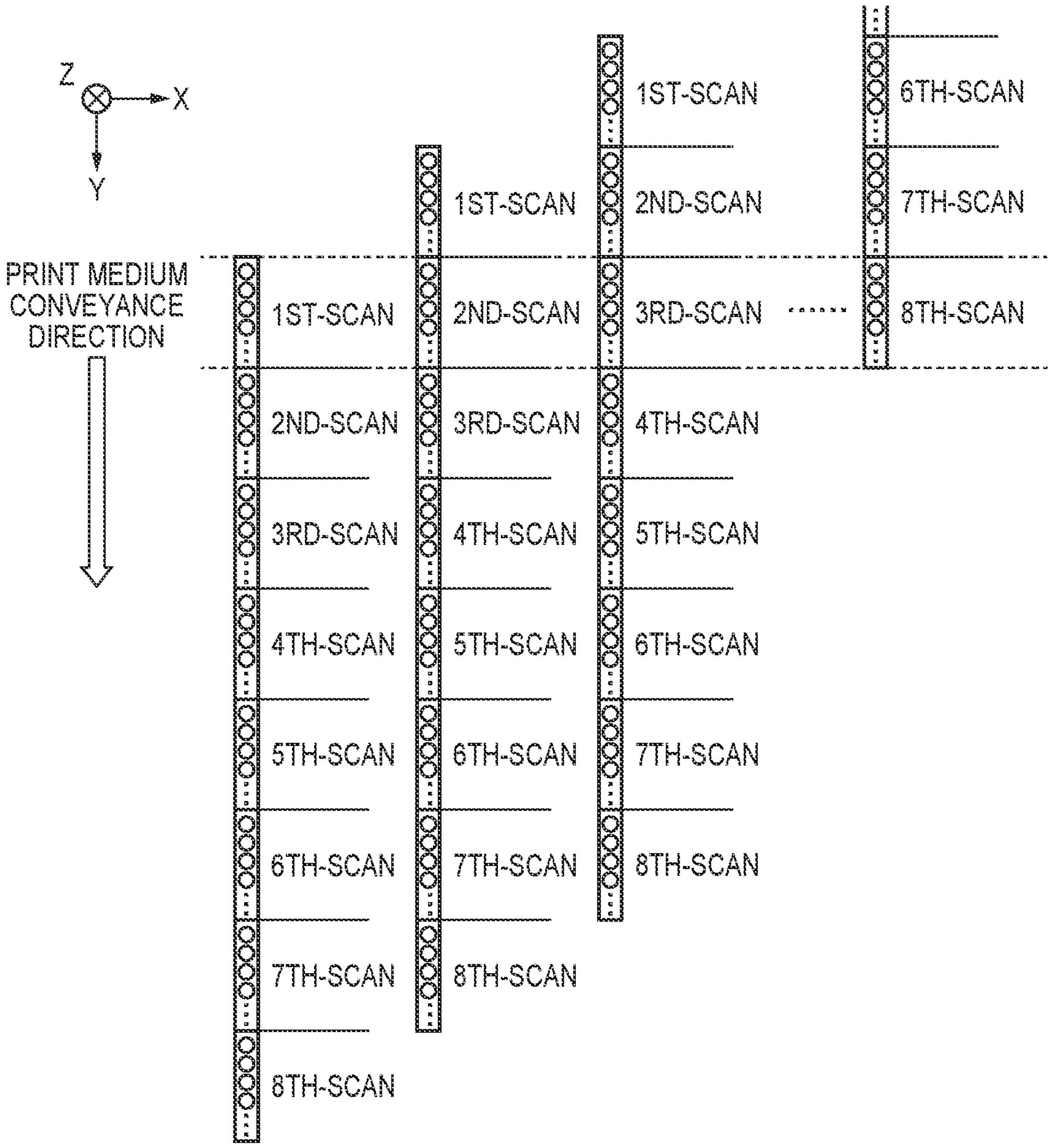
FIG. 5 is a view for explaining each scan.

FIG. 5 is a view for explaining examples of scans corresponding to nozzle positions. A 1st-scan region, a 2nd-scan region, . . . , are scanned from the upstream side in the conveyance direction (Y direction) of the print medium, and finally an 8th-scan region is scanned. The print resolution in the X direction is decided by the ejection frequency and the moving velocity of the carriage. The print resolution in the Y direction is decided by the nozzle resolution of the printhead 115. In this embodiment, each resolution is set at, for example, 600 [dpi]. Accordingly, the ejected ink droplets are printed at a resolution of 600 [dpi]×600 [dpi]. The optical sensor 118 performs a detecting operation while moving together with the carriage 116, thereby determining the presence/absence of a print medium on the platen 119.

<Explanation of Printhead>

Figure 3:
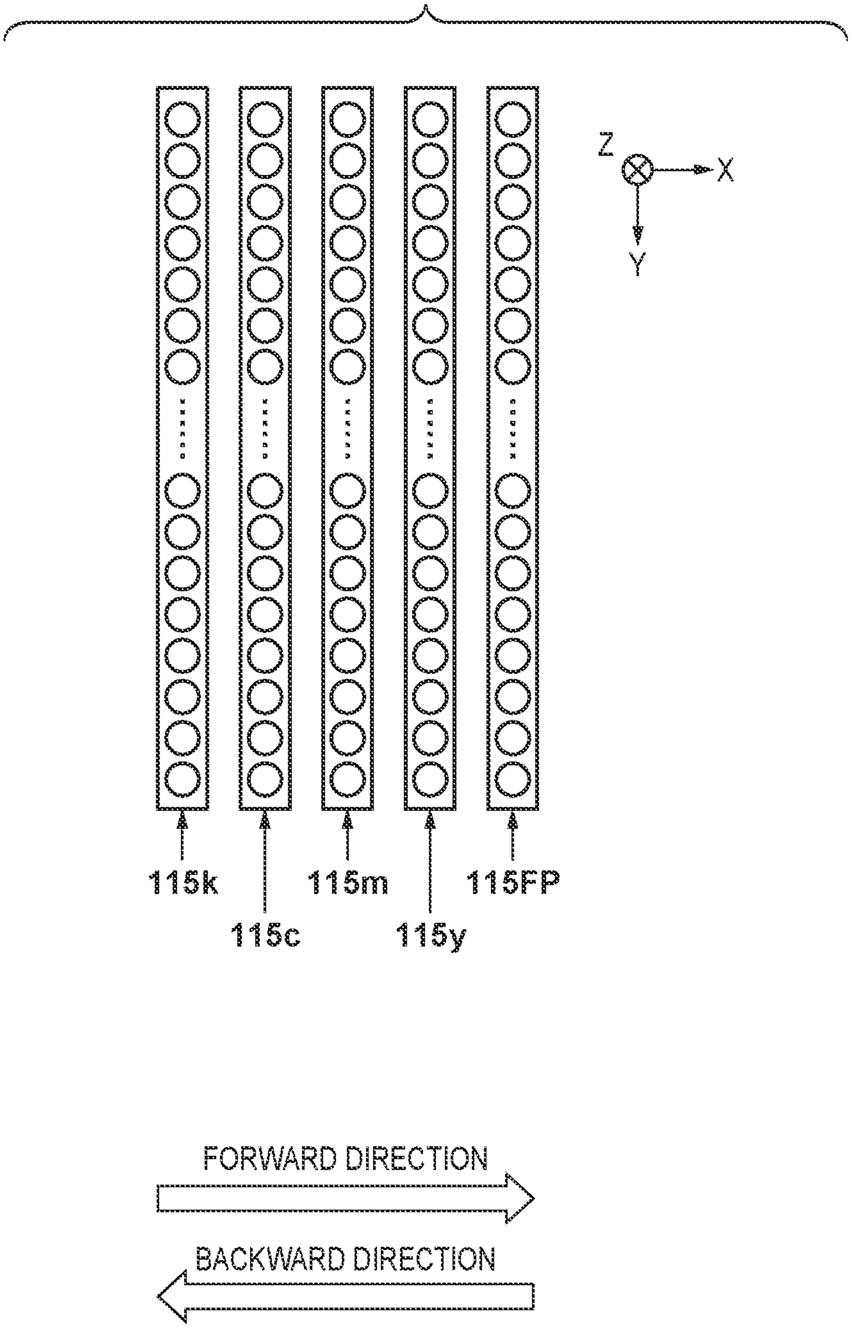
FIG. 3 is a view showing the arrangement of nozzle arrays.

FIG. 3 is a view showing the arrangement of nozzle arrays when the printhead 115 is viewed from the upper surface (the −Z direction) of the printing apparatus 108. In the printhead 115, the five nozzle arrays are arranged such that their positions in the X direction are different. That is, nozzle arrays 115C, 115M, 115Y, 115K, and 115FP respectively corresponding to C ink, M ink, Y ink, K ink, and FP ink are arranged. The nozzles of the nozzle array 115C eject ink droplets of C ink, the nozzles of the nozzle array 115M eject ink droplets of M ink, the nozzles of the nozzle array 115Y eject ink droplets of Y ink, the nozzles of the nozzle array 115K eject ink droplets of K ink, and the nozzles of the nozzle array 115FP eject ink droplets of FP ink. In each nozzle array, a plurality of nozzles for ejecting ink droplets are arrayed at a predetermined pitch along the Y direction. The printhead 115 as described above can apply fluorescent ink and non-fluorescent ink to a print medium.

This embodiment is not limited to a printing apparatus that performs a plurality of scans as described above, and can also be a printing apparatus using a full-line printhead. Nozzle arrays of the full-line printhead have a length corresponding to the width of a print medium, and nozzles are arrayed in a direction perpendicular to the conveyance direction of a print medium. The printhead is formed by arranging nozzle arrays for ejecting different types of inks in parallel along the conveyance direction. A print medium is conveyed in a direction perpendicular to the nozzle arrays by rotating a conveyor roller by the driving force of a motor. While the print medium is conveyed, the nozzles of a plurality of colors in the printhead eject ink droplets at a frequency corresponding to the conveyance velocity of the print medium. Consequently, ink dots of the individual colors are printed at a predetermined resolution, and an image of one page of the print medium is formed.

<Characteristics of Fluorescent Ink and Subtractive Mixture Ink>

Figure 4:
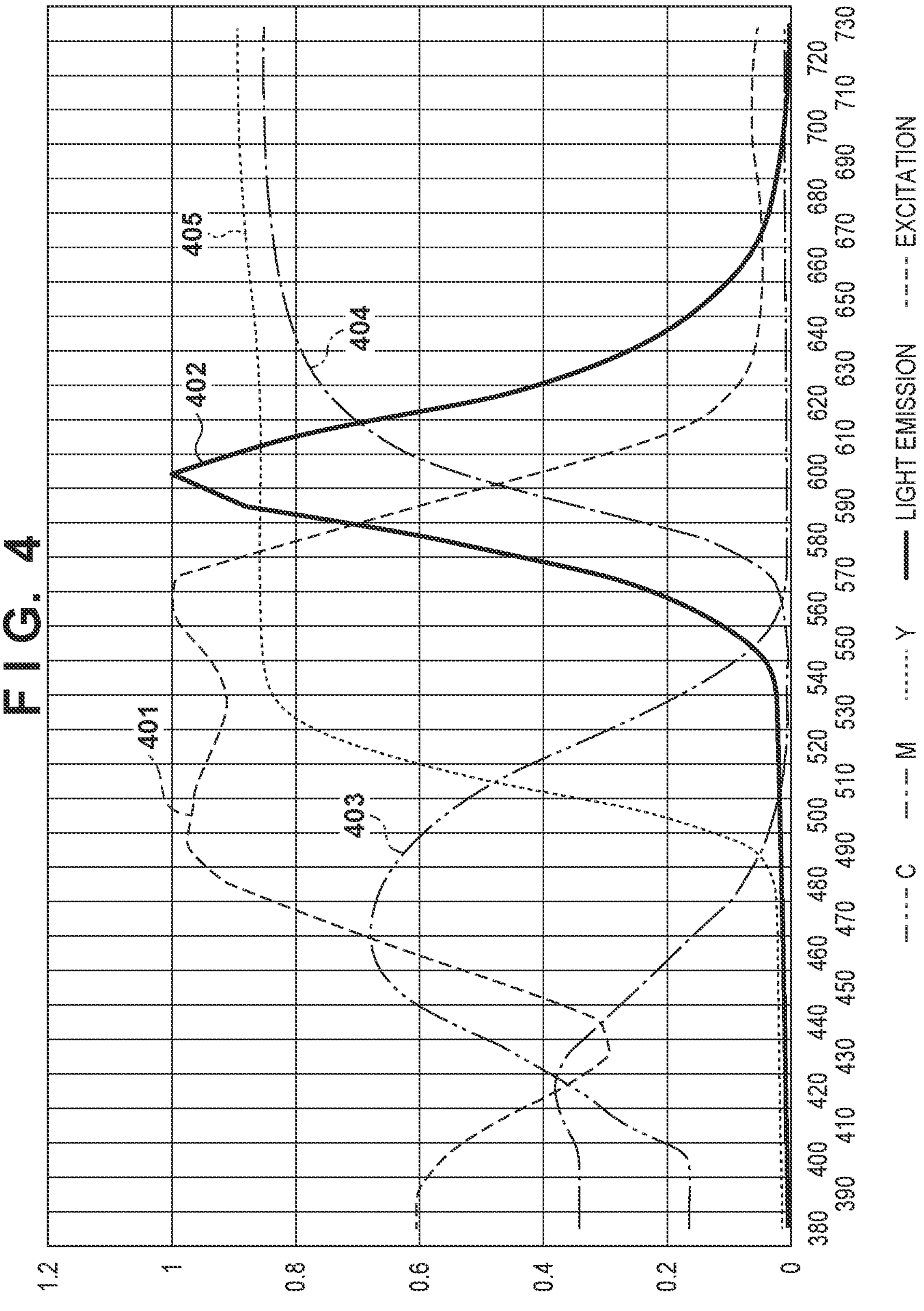
FIG. 4 is a view showing the intensity of an excitation wavelength and the intensity of an emission wavelength.

A fluorescent coloring material is a coloring material that generates a color by changing from a ground state to an excitation state by absorbing light having an excitation wavelength, and returning to the ground state by emitting light having an emission wavelength. FIG. 4 is a graph showing the intensity of an excitation wavelength 401 and the intensity of an emission wavelength 402 when fluorescent pink ink was printed on a print medium. In FIG. 4, the abscissa indicates the wavelength of light, and the ordinate indicates the intensity. This graph shown in FIG. 4 indicates the intensity of each light detected by changing the wavelength of light to be emitted to a print sample and the wavelength of light to be received from the sample.

The emission wavelength 402 represents the intensity of light received from the print sample at each wavelength, when the print sample was irradiated with light having the excitation wavelength. FIG. 4 shows the result obtained by irradiating the print sample with 480-nm light. The excitation wavelength 401 represents the intensity of received light when the wavelength of light to be received was fixed and the wavelength of light to be emitted to the print sample was changed. FIG. 4 shows the result when the wavelength of the light to be received was fixed to 600 nm. As shown in FIG. 4, the excitation wavelength region of fluorescent ink printed on a print medium overlaps the emission wavelength region and exists on a short-wavelength side. Also, the excitation wavelength 401 increases or decreases for each wavelength, and includes a wavelength that efficiently emits light and a wavelength that does not. In addition, since a fluorescent coloring material emits light, the reflectance at the emission wavelength often exceeds 1. In this embodiment, a coloring material having the characteristics as described above is called a fluorescent coloring material.

The excitation and light emission of fluorescent pink ink have been explained above. In this embodiment, however, it is also possible to use fluorescent ink that emits light at another wavelength. For example, it is possible to use fluorescent blue ink that emits light in a blue region (450 to 500 nm), or fluorescent green ink that emits light in a green region (500 to 565 nm). Furthermore, it is possible to use fluorescent yellow ink that emits light in a yellow region (565 to 590 nm), or fluorescent orange ink or fluorescent red ink that emits light in a red region (590 to 780 nm). It is also possible to use fluorescent ink obtained by combining the above-described inks. For example, it is possible to use fluorescent yellow ink that emits light in a region combining the yellow region and the red region. It is further possible to adjust the color tone by combining fluorescent inks different in intensity of the excitation wavelength. For example, it is possible to use fluorescent pink ink that has weak excitation in the blue region and strong excitation in the green region, and emits light in the orange region.

In this embodiment, non-fluorescent ink is called subtractive mixture ink. That is, ink that absorbs light having a specific wavelength, among light components emitted to the ink, and does not emit that light, is called subtractive mixture ink. For example, the subtractive mixture ink has spectral reflectances indicated by cyan ink 403, magenta ink 404, and yellow ink 405 shown in FIG. 4. Note that the graph of FIG. 4 shows spectral characteristics based on results measured by using a spectral reflectance measuring method. The subtractive mixture ink only absorbs light, unlike fluorescent ink, so the reflectance does not exceed 1. In this embodiment, the explanation includes black ink as one type of subtractive mixture ink. However, black ink need not be included.

Next, mixing colors of fluorescent ink and subtractive mixture ink on a print medium will be explained with reference to FIG. 4. Referring to FIG. 4, at least a portion of the excitation wavelength region of fluorescent pink ink exists within the range of the absorption wavelength region of yellow ink. When the fluorescent pink ink and the yellow ink 405 are mixed, the yellow ink absorbs light in the wavelength region of the excitation wavelength 401 of the fluorescent pink ink. Since the yellow ink absorbs the excitation light, the fluorescent pink ink cannot sufficiently excite, so the emission of light is suppressed.

Also, at least a portion of the excitation wavelength region of the fluorescent pink ink exists within the range of the absorption wavelength region of cyan ink. When the fluorescent pink ink and the cyan ink 403 are mixed, the cyan ink absorbs light in the wavelength region of the emission wavelength 402 of the fluorescent pink ink. Consequently, the cyan ink absorbs light emitted by the fluorescent pink ink, so the emission of light is suppressed.

In addition, at least a portion of the excitation wavelength region of the fluorescent pink ink exists within the range of the absorption wavelength region of magenta ink. When the fluorescent pink ink and the magenta ink 404 are mixed, the magenta ink absorbs light in the wavelength region of the fluorescent pink ink where the excitation sensitivity is high. Since the fluorescent pink ink cannot sufficiently excite, the emission of light is suppressed. Also, the magenta ink absorbs light emitted by the florescent pink ink, and the emission of light is suppressed.

When the fluorescent pink ink and black ink (not shown) are mixed, the black ink absorbs light in the wavelength region of the excitation wavelength 401 of the fluorescent pink ink, and also absorbs light in the wavelength region of the emission wavelength 402. Therefore, the fluorescent pink ink cannot sufficiently excite, and the emission of light is also suppressed.

More specifically, when the fluorescent pink ink and the subtractive mixture ink are mixed, the contribution ratio of the fluorescent pink ink to color generation decreases. This characteristic is largely influenced by the positional relationship between the fluorescent ink and the subtractive mixture ink on a print medium. When compared to a case in which an ink layer of the fluorescent ink is formed above an ink layer of the subtractive mixture ink, the fluorescent ink layer is strongly influenced by the subtractive mixture ink when the fluorescent ink layer is formed below the subtractive mixture ink layer. As a consequence, the contribution ratio of the fluorescent pink ink to color generation is lower when the fluorescent ink layer is formed below the subtractive mixture ink layer, than when the fluorescent ink layer is formed above the subtractive mixture ink layer.

<Fluorescent Ink>

Fluorescent ink to be used in this embodiment will be explained below. This embodiment uses fluorescent ink formed by mixing a dispersion of a coloring material having fluorescent characteristics, a solvent, and an activator. The dispersion of the fluorescent coloring material used in this embodiment is a dispersion of a coloring material having the above-described fluorescent characteristics. Examples are NKW-3207E (a fluorescent pink water dispersion: Nippon Keiko Kagaku) and NKW-3205E (a fluorescent yellow water dispersion: Nippon Keiko Kagaku). However, it is possible to use any dispersion of a coloring material having the fluorescent characteristics.

Ink is formed by dispersing the abovementioned fluorescent coloring material dispersion by combining a known solvent and a known activator. The method of dispersing the fluorescent coloring material dispersion is not particularly limited. For example, it is possible to use a fluorescent coloring material dispersion dispersed by using a surfactant, or a resin-dispersed fluorescent coloring material dispersion dispersed by using a dispersion resin. It is, of course, also possible to combine fluorescent coloring material dispersions obtained by different dispersion methods. As the surfactant, it is possible to use an anionic, nonionic, cationic, or zwitterionic surfactant. As the dispersion resin, any resin having water solubility or water dispersibility can be used. In particular, a dispersion resin having a weight-average molecular weight of 1,000 (inclusive) to 100,000 (inclusive), preferably 3,000 (inclusive) to 50,000 (inclusive), is favorable. As the solvent, it is favorable to use an aqueous medium containing water and a water-soluble organic solvent.

<Print Medium>

A print medium according to this embodiment has a substrate and at least one ink absorbing layer. This embodiment uses, for example, a print medium for printing performed by an inkjet printing method. For example, this embodiment uses glossy paper as a print medium, and pigment ink as a coloring material.

<Multicolor of Fluorescent Ink and Subtractive Mixture Ink>

In a color (to be also referred to as a "multicolor" hereinafter) formed by a plurality of colors of subtractive mixture inks, even when the absorption wavelengths of the individual colors interfere with each other, the light absorptance at the absorption wavelength only increases, and the absorption of another color is not obstructed. In a multicolor of fluorescent ink and subtractive mixture ink, however, the light emission of the fluorescent ink is suppressed as described previously. Accordingly, the contribution ratio of the fluorescent ink to color generation abruptly reduces, and this causes a steep color change compared to a color change of a multicolor between subtractive mixture inks. Consequently, an adverse effect to the image of a pseudo contour occurs.

FIGS. 9A to 9D are views schematically showing the number of dots and the dot arrangement of a multicolor resulting from the difference between the ink amounts of fluorescent ink and cyan ink when using a conventional method. "%" in FIGS. 9A to 9D is a numerical value that is 100% when one dot is ejected to all pixels of 4×4 pixels=16 pixels. FIG. 9A is a view schematically showing the number of dots and the dot arrangement when fluorescent ink is 75% and cyan ink is 50%. FIG. 9B is a view schematically showing the number of dots and the dot arrangement when fluorescent ink is 75% and cyan ink is 75%. FIG. 9C is a view schematically showing the number of dots and the dot arrangement when fluorescent ink is 50% and cyan ink is 50%. FIG. 9D is a view schematically showing the number of dots and the dot arrangement when fluorescent ink is 50% and cyan ink is 75%.

When the both inks are 50% as shown in FIG. 9C, no dot overlap occurs between the fluorescent ink and the cyan ink. However, dot overlap of the fluorescent ink and the cyan ink occurs in FIGS. 9A, 9B, and 9D. Therefore, the light emission of the fluorescent ink is suppressed as described above.

Figure 6:
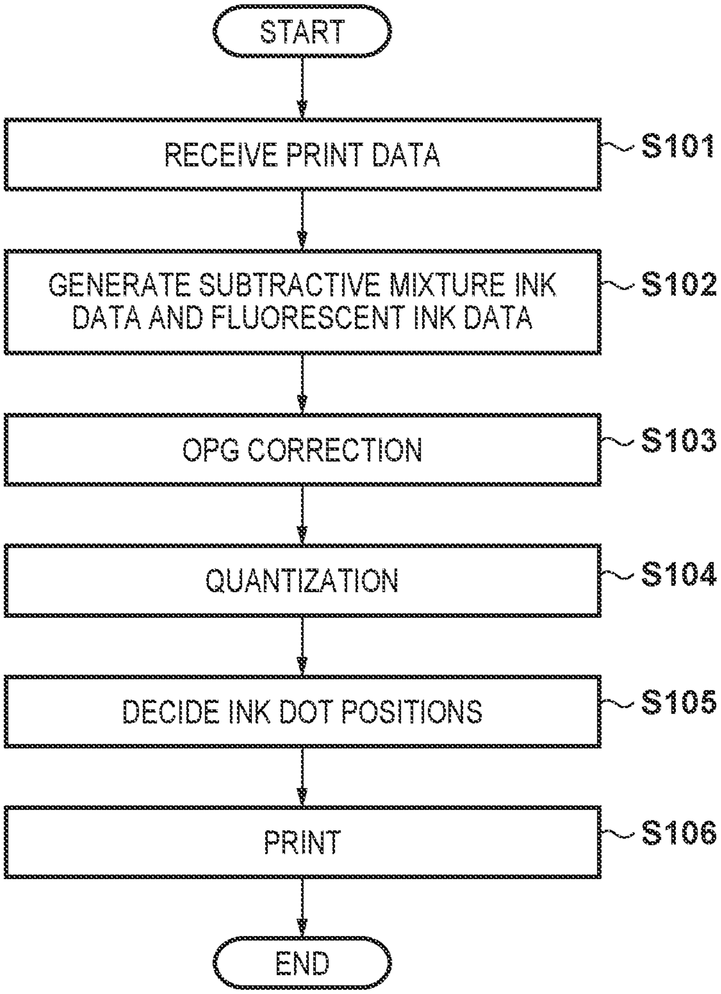
FIG. 6 is a flowchart showing a whole printing process.

FIG. 6 is a flowchart showing the whole printing process according to this embodiment. This process shown in FIG. 6 can control printing so as to suppress a steep color change of a multicolor of fluorescent ink and subtractive mixture ink. The process shown in FIG. 6 is implemented by the CPU 111 by reading out a program stored in the ROM 113 to the RAM 112 and executing the readout program. The process shown in FIG. 6 may also be executed by the image processing accelerator 109.

In S101, the CPU 111 receives print data transmitted from the PC 101. This print data contains RGB data or CMYK data. In S102, the CPU 111 generates subtractive mixture ink data and fluorescent ink data from the print data acquired in S101. Note that the fluorescent ink data may also be acquired as data different from the print data.

In S103, the CPU 111 performs OutPut Gamma (OPG) correction corresponding to the dot coverage on a print medium. S102 and S103 correspond to the above-described color conversion process, and are repeated for each pixel. In S104, the CPU 111 performs the above-described quantization process.

In S105, the CPU 111 performs a process of deciding the dot positions of fluorescent ink based on the quantization result in S104. Although the process of deciding the dot positions of fluorescent ink will be described later, a process of changing the dot arrangement of fluorescent ink decided from the fluorescent ink data is performed. In S106, the CPU 111 performs printing by controlling the printhead 115 based on the dot positions and the number of dots to be ejected of the subtractive mixture ink, and the dot positions and the number of dots to be ejected of the fluorescent ink decided in S105.

The above process can suppress a steep color change of a multicolor of fluorescent ink and subtractive mixture ink. If fluorescent ink is added to the gamut of a complementary color with respect to the emission wavelength of the fluorescent ink, a color gamut printable by the printing apparatus 108 reduces. In this embodiment, therefore, the fluorescent ink data is generated in S102 in a predetermined color gamut based on the emission wavelength of the fluorescent ink. A process of deciding the dot arrangement of the fluorescent ink in step S105 will be explained with reference to FIG. 7.

Figure 7:
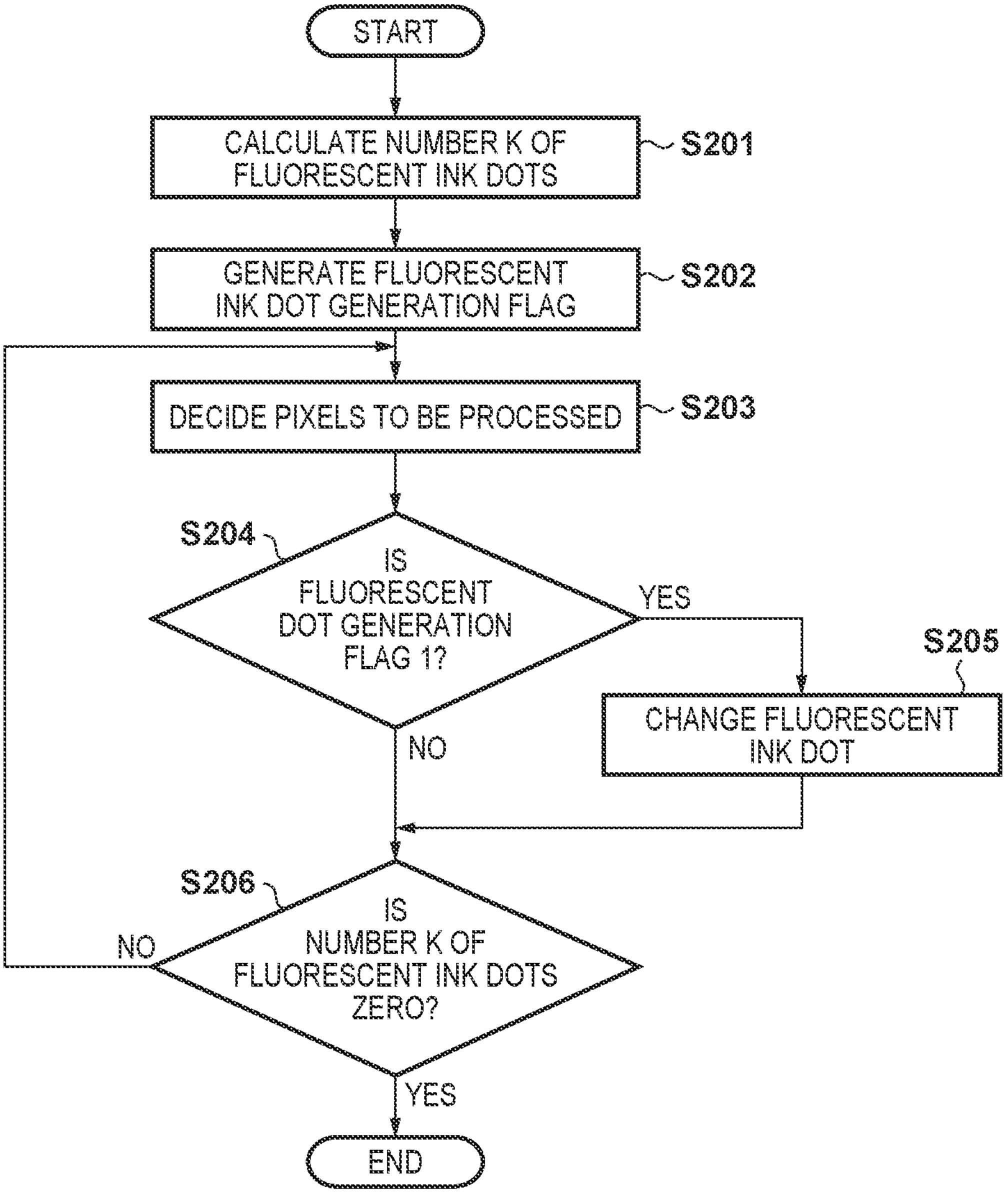
FIG. 7 is a flowchart showing a process of deciding the dot arrangement of fluorescent ink.

FIG. 7 is a flowchart showing the process of deciding the dot arrangement of the fluorescent ink. This process shown in FIG. 7 decides the dot arrangement of the fluorescent ink based on the dot arrangement of the subtractive mixture ink. In this embodiment, the dot arrangement is decided such that two or more fluorescent ink dots are applied to at least one pixel, and there is no pixel to which both a fluorescent ink dot and a subtractive mixture ink dot are applied.

In S201, the CPU 111 calculates a number K of fluorescent ink dots in a predetermined region, from the quantization result in S104. In this embodiment, a 4×4 pixel region will be explained in order to simplify the explanation.

FIG. 8A is a view schematically showing the fluorescent ink amount data processed in S103 in the 4×4 pixel region as an example. FIG. 8B is a view schematically showing the quantization result data of fluorescent ink processed in S104. FIG. 8D is a view schematically showing a threshold mask to be used in the quantization process in S104. In S104, the quantization result as shown in FIG. 8B is output by using the fluorescent ink amount data shown in FIG. 8A and the threshold mask shown in FIG. 8D. Calculating the number K of fluorescent ink dots is to calculate, for example, the total value (the total number of dots) of quantized values in the 4×4 pixel region. In the case of the quantization result data of fluorescent ink shown in FIG. 8B, the number K of fluorescent ink dots=10.

In S202, the CPU 111 generates a fluorescent ink dot generation flag. FIG. 8E is a view schematically showing the fluorescent ink dot generation flag processed in S202 in the 4×4 pixel region as an example. "1" represents "generate a dot", and "0" represents "do not generate a dot". This fluorescent ink dot generation flag is generated based on the fluorescent ink amount shown in FIG. 8A, and the dot arrangement of subtractive mixture ink forming a multicolor. In FIG. 8E, a pixel having a fluorescent ink amount and having no subtractive mixture ink dot is "1", and other pixels are "0". FIG. 8C is a view schematically showing the cyan dot quantization result as an example. The fluorescent ink dot generation flag as shown in FIG. 8E is generated from the cyan dot quantization result shown in FIG. 8C and the fluorescent ink amount shown in FIG. 8A.

In S203, the CPU 111 decides pixels to be processed in the 4×4 pixel region. The pixels to be processed are decided in ascending order of threshold values in the threshold mask shown in FIG. 8D. For example, in the case of FIG. 8D, a pixel corresponding to a threshold value "1" is decided first as the pixel to be processed. In S203, the CPU 111 determines whether the fluorescent dot generation flag generated in S202 is "1" for the pixel to be processed decided in S203. If it is determined that the fluorescent dot generation flag is "1", that is, if there is a fluorescent ink amount and no subtractive mixture ink dot exists, the process advances to step S205. On the other hand, if it is determined that the fluorescent dot generation flag is not "1", that is, is "0", the process advances to S206.

In S205, the CPU 111 changes the quantized value of the fluorescent ink dot. Changing the quantized value is to add 1 to the quantized value of the pixel to be processed. Then, the CPU 111 subtracts 1 from the number K of fluorescent ink dots. After S205, the process advances to S206.

In S206, the CPU 111 determines whether the number K of fluorescent ink dots is 0. If it is determined that the number K of fluorescent ink dots is 0, the CPU 111 terminates the processing in the 4×4 pixel region, and advances to the processing of a next 4×4 pixel region. For example, the CPU 111 selects a 4×4 pixel region adjacent to the 4×4 pixel region processed in FIG. 7 as an object to be processed, and executes the process shown in FIG. 7. On the other hand, if it is determined that the number K of fluorescent ink dots is not 0, the CPU 111 decides a next pixel to be processed in S203. That is, in the case of FIG. 8D, the CPU 111 decides a pixel corresponding to a threshold value "2" as a pixel to be processed. Then, the CPU 111 repeats the processing from S204.

The processing from S203 will be explained below with reference to FIG. 8. The fluorescent ink dot generation flag is "0" for the pixel to be processed corresponding to the threshold value "1" decided in S203. Therefore, the process advances from S204 to S206. In this case, the quantized value of the fluorescent ink dot is "0". This is so because this pixel to be processed is a pixel for which the fluorescent ink dot generation flag is "0" in FIG. 8E, that is, a pixel in which, if a fluorescent ink dot is generated, the fluorescent ink dot overlaps a cyan dot. Therefore, even when the quantized value is not "0" in FIG. 8B, it is changed to "0". This similarly applies to pixels for which the quantized value is "0".

Since the fluorescent ink dot generation flag is "0" for the pixel to be processed corresponding to the threshold value "2", the process advances to S206. In this case, the quantized value of the fluorescent ink dot is "0".

Since the fluorescent ink dot generation flag is "0" for a pixel to be processed corresponding to a threshold value "3", the process advances to S206. In this case, the quantized value of the fluorescent ink dot is "0".

Since the fluorescent ink dot generation flag is "0" for a pixel to be processed corresponding to a threshold value "4", the process advances to S206. In this case, the quantized value of the fluorescent ink dot is "0".

Since the fluorescent ink dot generation flag is "1" for a pixel to be processed corresponding to a threshold value "5", the process advances to S205. In this case, the quantized value of the fluorescent ink dot is "2" obtained by adding 1 to the quantized value "1" shown in FIG. 8B. Also, the number K of fluorescent ink dots is 10−1=9.

Since the fluorescent ink dot generation flag is "0" for a pixel to be processed corresponding to a threshold value "6", the process advances to S206. In this case, the quantized value of the fluorescent ink dot is "0".

Since the fluorescent ink dot generation flag is "1" for a pixel to be processed corresponding to a threshold value "7", the process advances to S205. In this case, the quantized value of the fluorescent ink dot is "2" obtained by adding 1 to the quantized value "1" shown in FIG. 8B. Also, the number K of fluorescent ink dots is 9−1=8.

Since the fluorescent ink dot generation flag is "0" for a pixel to be processed corresponding to a threshold value "8", the process advances to S206. In this case, the quantized value of the fluorescent ink dot is "0".

Since the fluorescent ink dot generation flag is "1" for a pixel to be processed corresponding to a threshold value "9", the process advances to S205. In this case, the quantized value of the fluorescent ink dot is "2" obtained by adding 1 to the quantized value "1" shown in FIG. 8B. Also, the number K of fluorescent ink dots is 8−1=7.

Since the fluorescent ink dot generation flag is "0" for a pixel to be processed corresponding to a threshold value "10", the process advances to S206. In this case, the quantized value of the fluorescent ink dot is "0".

Since the fluorescent ink dot generation flag is "1" for a pixel to be processed corresponding to a threshold value "11", the process advances to S205. In this case, the quantized value of the fluorescent ink dot is "1" obtained by adding 1 to the quantized value "0" shown in FIG. 8B. Also, the number K of fluorescent ink dots is 7−1=6.

Since the fluorescent ink dot generation flag is "1" for a pixel to be processed corresponding to a threshold value "12", the process advances to S205. In this case, the quantized value of the fluorescent ink dot is "1" obtained by adding 1 to the quantized value "0" shown in FIG. 8B. Also, the number K of fluorescent ink dots is 6−1=5.

Since the fluorescent ink dot generation flag is "1" for a pixel to be processed corresponding to a threshold value "13", the process advances to S205. In this case, the quantized value of the fluorescent ink dot is "1" obtained by adding 1 to the quantized value "0" shown in FIG. 8B. Also, the number K of fluorescent ink dots is 5−1=4.

Since the fluorescent ink dot generation flag is "0" for a pixel to be processed corresponding to a threshold value "14", the process advances to S206. In this case, the quantized value of the fluorescent ink dot is "0".

Since the fluorescent ink dot generation flag is "0" for a pixel to be processed corresponding to a threshold value "15", the process advances to S206. In this case, the quantized value of the fluorescent ink dot is "0".

Since the fluorescent ink dot generation flag is "0" for a pixel to be processed corresponding to a threshold value "16", the process advances to S206. In this case, the quantized value of the fluorescent ink dot is "0".

The sum of new quantized values of the fluorescent ink dots is 9. On the other hand, the sum of the quantized values of the fluorescent ink dots acquired in S201, that is, the number K of fluorescent ink dots is 10. That is, the sum "9" of the new quantized values of the fluorescent ink dots does not reach the sum "10" of the quantized values of the fluorescent ink dots in the first place. More specifically, the difference "1" between the quantized values must be assigned to a given pixel. If it is determined in S206 that the decremented number K of fluorescent ink dots is not 0, the processing from S203 is repeated so that the sum of the new quantized values of the fluorescent ink dots reach the original sum of the quantized values of the fluorescent ink dots.

Again, the fluorescent ink dot generation flag is 0 for the pixel to be processed corresponding to the threshold value "1" decided in S203. Therefore, the process advances from S204 to S206. In this case, the quantized value of the fluorescent ink dot is "0".

Since the fluorescent ink dot generation flag is "0" for the pixel to be processed corresponding to the threshold value "2", the process advances to S206. In this case, the quantized value of the fluorescent ink dot is "0". This applies to the threshold values "3" and "4".

Since the fluorescent ink dot generation flag is "1" for the pixel to be processed corresponding to the threshold value "5", the process advances to S205. Assume that the quantized value of a present fluorescent ink dot in this pixel to be processed is "2", and the number of dots that can be generated in one pixel is limited to 2. In this case, this embodiment advances the process to a next pixel to be processed, without adding 1 to the quantized value of the fluorescent ink dot in this pixel to be processed. That is, the quantized value of the fluorescent ink dot in this pixel to be processed remains "2". Also, the number K of fluorescent ink dots is 4−1=3.

Since the fluorescent ink dot generation flag is "0" for the pixel to be processed corresponding to the threshold value "6", the process advances to S206. In this case, the quantized value of the fluorescent ink dot is "0".

Since the fluorescent ink dot generation flag is "1" for the pixel to be processed corresponding to the threshold value "7", the process advances to S205. In this case, the quantized value of a present fluorescent ink dot in this pixel to be processed is "2", and the number of dots that can be generated in one pixel is limited to 2. Accordingly, the process advances to a next pixel to be processed, without adding 1 to the quantized value of the fluorescent ink dot in this pixel to be processed. That is, the quantized value of the fluorescent ink dot in this pixel to be processed remains "2". Also, the number K of fluorescent ink dots is 3−1=2.

Since the fluorescent ink dot generation flag is "0" for the pixel to be processed corresponding to the threshold value "8", the process advances to S206. In this case, the quantized value of the fluorescent ink dot is "0".

Since the fluorescent ink dot generation flag is "1" for the pixel to be processed corresponding to the threshold value "9", the process advances to S205. In this case, the quantized value of a present fluorescent ink dot in this pixel to be processed is "2", and the number of dots that can be generated in one pixel is limited to 2. Accordingly, the process advances to a next pixel to be processed, without adding 1 to the quantized value of the fluorescent ink dot in this pixel to be processed. That is, the quantized value of the fluorescent ink dot in this pixel to be processed remains "2". Also, the number K of fluorescent ink dots is 2−1=1.

Since the fluorescent ink dot generation flag is "0" for the pixel to be processed corresponding to the threshold value "10", the process advances to S206. In this case, the quantized value of the fluorescent ink dot is "0".

Since the fluorescent ink dot generation flag is "1" for the pixel to be processed corresponding to the threshold value "11", the process advances to S205. In this case, the quantized value of a present fluorescent ink dot in this pixel to be processed is "1", that is, has not reached "2" as the limit of the number of dots that can be generated in one pixel. Accordingly, the quantized value of the fluorescent ink dot is "2" obtained by adding 1 to the quantized value "1". Also, the number K of fluorescent ink dots is 1−1=0. Then, it is determined in S206 that the number K of fluorescent ink dots is 0, so the process shown in FIG. 7 for this 4×4 pixel region is terminated.

FIG. 8F is a view schematically showing the number of dots and the dot arrangement of fluorescent ink dots as a result of the abovementioned process. As shown in FIG. 8F, a fluorescent ink dot is arranged in a position where it does not overlap a cyan dot. In addition, positions where the quantized value is "2" and a plurality of dots are ejected are decided in ascending order of threshold values in the threshold mask. This is so because the threshold values are processed in ascending order in S203 when deciding a pixel to be processed. In this embodiment, a position where a plurality of dots are ejected can be decided based on the threshold mask. A configuration like this can decide a position where a plurality of dots are ejected while maintaining the blue noise characteristic of the threshold mask, and hence can improve the granular feeling.

The above processing can decide the number of dots of fluorescent ink and subtractive mixture ink to be applied in a predetermined region, and the positions of pixels to which these inks are applied. This decision is made so as not to apply a fluorescent ink dot and a subtractive mixture ink dot to the same pixel, so the subtractive mixture ink does not suppress the light emission of the fluorescent ink. Consequently, it is possible to suppress a steep color change of a multicolor of the fluorescent ink and the subtractive mixture ink.

FIGS. 10A to 10D are views schematically showing the number of dots to which a multicolor is applied and the positions of pixels to which the multicolor is applied in accordance with a difference between the ink amounts of fluorescent ink and cyan ink. In FIGS. 10A to 10D, "%" is a numerical value that is 100% when one dot is ejected to all pixel positions in a predetermined region. FIG. 10A is a view schematically showing the number of dots to be applied and pixel positions to which the dots are applied when fluorescent ink is 75% and cyan ink is 50%. FIG. 10B is a view schematically showing the number of dots to be applied and pixel positions to which the dots are applied when fluorescent ink is 75% and cyan ink is 75%. FIG. 10C is a view schematically showing the number of dots to be applied and pixel positions to which the dots are applied when fluorescent ink is 50% and cyan ink is 50%. FIG. 10D is a view schematically showing the number of dots to be applied and pixel positions to which the dots are applied when fluorescent ink is 50% and cyan ink is 75%.

The case in which the both inks are 50% shown in FIG. 10C is the same as FIG. 9C. On the other hand, in FIGS. 10A, 10B, and 10D, pixel positions to which fluorescent ink is applied and the number of dots to be applied are decided such that cyan dots and fluorescent ink dots do not overlap each other. Furthermore, by giving two or more fluorescent ink dots to the same pixel position, it is possible to avoid the suppression of light emission by the subtractive mixture ink while maintaining the light emission of the fluorescent ink.

The number of pixels to which fluorescent ink dots are applied and the number of dots to be applied will be explained below. Letting T be the number of pixels to which dots are applied and D be the number of dots to be applied, a ratio W of the number of pixels to which dots are applied to the number of dots to be applied is calculated by equation (1) below:

$$W=T/D \quad (1)$$

A case within a predetermined region will be explained below by using a practical example. When the predetermined region is a 4×4 pixel region, a number L of pixels in the predetermined region is 16. In this embodiment, the predetermined region is a 4×4 pixel region. However, the present invention is not limited to this. The number L of pixels need only be a natural number of 2 or more.

A number P of pixels to which fluorescent ink is applied in FIG. 9B is 12. Also, a number M of dots to which fluorescent ink is applied is 12. A number Q of pixels to which dots of cyan ink as subtractive mixture ink is also 12, and a number N of dots to be applied is 12. That is, the ratio W of the number of pixels to which dots are applied to the number of dots to be applied is calculated as follows for both fluorescent ink and subtractive mixture ink:

$$W=12/12=1.0$$

On the other hand, cyan ink remains 1.0 in FIG. 10B. However, the number P of pixels to which fluorescent ink dots are applied is 4. The number M of dots to which fluorescent ink is applied is 12, so the ratio W of the number of pixels to which dots are applied to the number of dots to be applied is calculated as follows:

$$W=4/12=0.25$$

The ratio W for fluorescent ink is smaller than 1.0. When M≥1 and M+N>L and M<L and N<L, the sum of the numbers of dots to which colors forming a multicolor are applied exceeds 100%, and the numbers of dots to which fluorescent ink and subtractive mixture ink are applied are smaller than the number L of pixels in the predetermined region. When one or more fluorescent ink dots are applied to one pixel in a case like this, the ratio W of fluorescent ink is small than 1.0. In addition, the ratio W=M/P of fluorescent ink is smaller than the ratio W=N/Q of subtractive mixture ink. In the above explanation, the number M of dots to which fluorescent ink is applied and the number P of pixels to which the dots are applied, and the number N of dots to which subtractive mixture ink is applied and the number Q of pixels to which the dots are applied, are natural numbers.

As described above, this embodiment performs control so as to decrease the ratio of the number of pixels to which dots are applied to the number of dots to be applied, so that a fluorescent ink dot does not overlap a subtractive mixture ink dot. A configuration like this can suppress a steep color change of a multicolor of fluorescent ink and subtractive mixture ink.

Second Embodiment

Differences of the second embodiment from the first embodiment will be explained below. In the first embodiment, pixel positions to which fluorescent ink dots are applied is so controlled that a fluorescent ink dot does not overlap a subtractive mixture ink dot. Depending on the number of scans of a printhead 115, the number of dots to be applied to the same pixel position has an upper limit. In the case of 8 scans, for example, the number of dots to be applied to the same pixel position is 8. When it is necessary to decrease the number of scans in order to perform printing at high speed, it is possible to increase the speed of the printing process and suppress a steep color change of a multicolor of fluorescent ink and subtractive mixture ink at the same time. In this embodiment, therefore, processing when the number of dots to be applied to the same pixel position has an upper limit will be explained. In the first embodiment, the processing in which, when the number of dots in a pixel to be processed is limited, the quantized value of another pixel to be processed not having reached the limit and not overlapping a subtractive mixture ink dot is added, has been explained. In this embodiment, the form of another processing when the number of dots in a pixel to be processed is limited will be explained.

Figure 11:
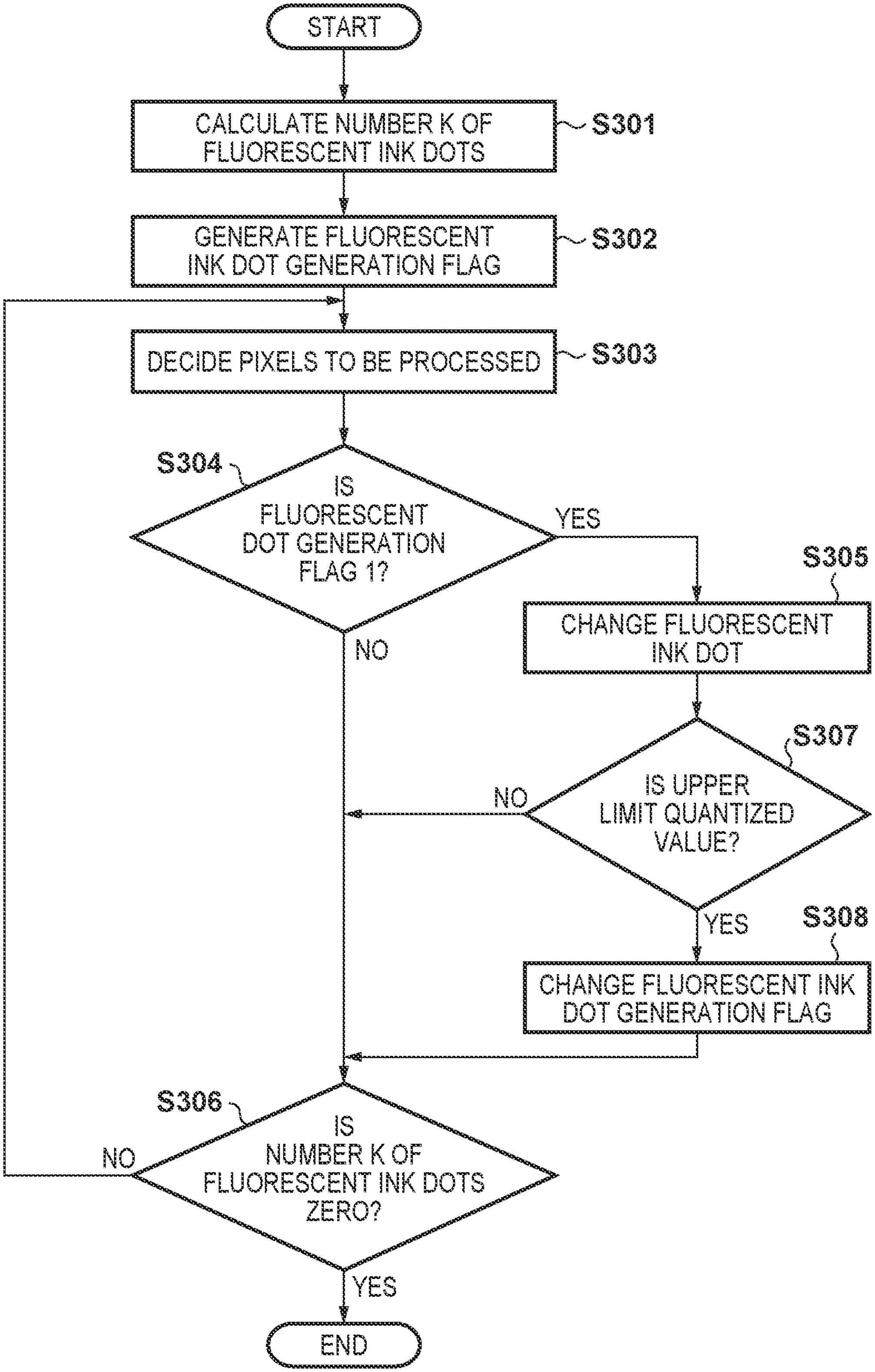
FIG. 11 is a flowchart showing a process of deciding the dot arrangement of fluorescent ink.

FIG. 11 is a flowchart showing the whole printing process of this embodiment. In this embodiment, even when the number of dots to be applied to the same pixel position has an upper limit, the process shown in FIG. 11 can control printing so as to suppress a steep color change of a multicolor of fluorescent ink and subtractive mixture ink. This process shown in FIG. 11 is implemented by, for example, a CPU 111 by reading out a program stored in a ROM 113 to a RAM 112 and executing the readout program. The process shown in FIG. 11 can also be executed by an image processing accelerator 109. S301 to S306 are the same as S201 to S206, so an explanation thereof will be omitted.

In S307, the CPU 111 determines whether the quantized value has exceeded the upper-limit dot count. More specifically, it is possible to, for example, previously hold a dot count conversion table corresponding to quantized values, and perform conversion in accordance with the table, thereby calculating the dot count from the quantized value. This determination in S307 can also be performed by comparing the calculated dot count with an upper-limit dot count decided based on the number of scans of the printhead 115. If it is determined that the dot count has exceeded the upper-limit dot count, the process advances to S308. If it is determined that the dot count has not exceeded the upper-limit dot count, the process advances to S306.

Figure 12A:
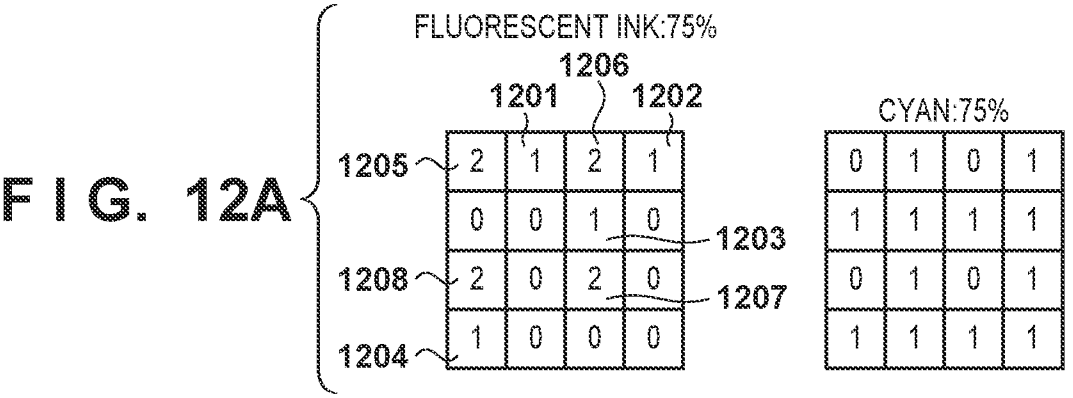
FIGS. 12A to 12B are views for explaining examples of a 4×4 pixel region.

In S308, the CPU 111 changes a fluorescent ink dot generation flag. In this step, a pixel to be changed is a pixel adjacent to a pixel to be processed of interest. The adjacent pixel is a pixel which is adjacent in the main scan direction and the conveyance direction on the surface of a print medium and for which the fluorescent ink dot generation flag is "0". The CPU 111 changes the fluorescent ink dot generation flag of the adjacent pixel from "0" to "1". By thus changing "0" to "1", the quantized value of fluorescent ink increases. As a consequence, a fluorescent ink dot is ejected to the pixel. FIG. 12A is a view schematically showing the quantized values when the abovementioned processing is executed. Pixels 1201, 1202, 1203, and 1204 shown in FIG. 12A indicate that the fluorescent ink dot generation flag is changed from "0" to "1". In the pixels 1201 to 1204, fluorescent ink dots are generated even in pixel positions to which cyan dots are applied. Also, the generated fluorescent ink dots are adjacent to pixel positions to which no cyan ink dot is applied, that is, to pixels 1205, 1206, 1207, and 1208. In other words, a fluorescent ink dot can be generated even in a pixel position to which a cyan dot is to be applied, if the condition that the pixel is adjacent to a pixel position to which no cyan dot is applied is met. In a dot arrangement like this, even when cyan ink dots and fluorescent ink dots are ejected to overlap each other in the pixels 1201 to 1204, the fluorescent ink can ooze out to the adjacent pixels 1205 to 1208 where no cyan ink dot exists. This makes it possible to prevent cyan ink from obstructing the light emission of fluorescent ink. Consequently, even when the number of dots in the same pixel position has an upper limit, printing can be controlled so as to suppress a steep color change of a multicolor of fluorescent ink and subtractive mixture ink.

Figure 13:
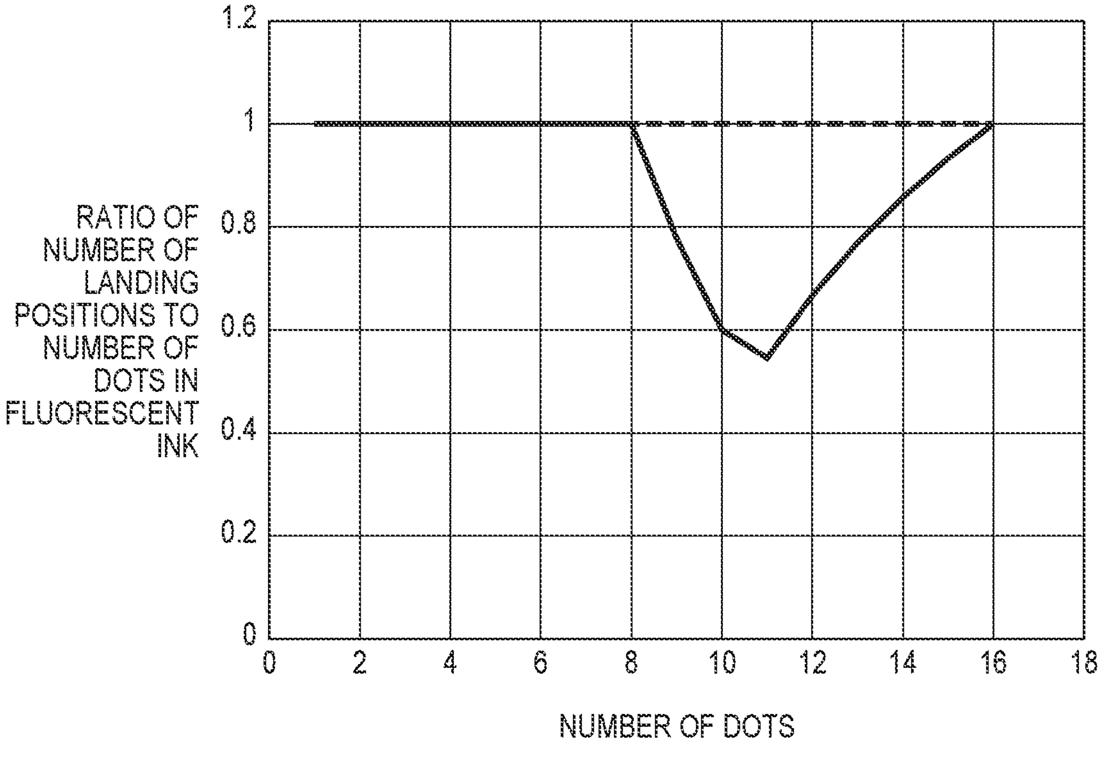
FIG. 13 is a view showing the ratio of the number of pixels to the number of dots.

FIG. 13 is a graph showing a ratio W of the number of pixels to which dots are applied to the number of dots to be applied, when the number of dots has an upper limit. FIG. 13 shows a graph when the upper limit of the number of dots to be applied is 2. The abscissa indicates the numbers of fluorescent ink dots and subtractive mixture ink dots to be applied, and the ordinate indicates the ratio W of the number of pixels to which dots are applied to the number of dots to be applied in a 4×4 pixel region. FIG. 13 shows that when the number of dots to be applied is 4 on the abscissa, the number of fluorescent ink dots to be applied is 4, and the number of subtractive mixture ink dots to be applied is also 4. The dotted line indicates a conventional change, and the solid line indicates a change in this embodiment.

As shown in FIG. 13, when the numbers of fluorescent ink dots and subtractive mixture ink dots to be applied are 8, the ratio W of the number of pixels to which fluorescent ink dots are applied to the number of dots to be applied is 1.0. After that, the ratio W decreases as the number of dots to be applied increases. When the numbers of fluorescent ink dots and subtractive mixture ink dots are 11, the number of dots has reached 2, that is, the upper limit. After that, as the number of dots to be applied increases, fluorescent ink dots are generated even in pixel positions to which subtractive mixture ink dots are applied, so the ratio W increases. This can improve the coverage of ink dots on the surface of a print medium.

As described above, even when the number of dots has reached its upper limit, a pixel position to which a fluorescent ink dot is to be applied is controlled to a pixel position adjacent to a position where no subtractive mixture ink dot exists. This makes it possible to suppress a steep color change of a multicolor of fluorescent ink and subtractive mixture ink.

Third Embodiment

Differences of the third embodiment from the first and second embodiments will be explained below. In this embodiment, control of the dot arrangement of subtractive mixture ink in a case where printing is performed by using thin ink and the number of dots in the same pixel position has reached the upper limit will be explained. Processing in this embodiment will be explained below with reference to FIG. 12B.

Figure 12B:
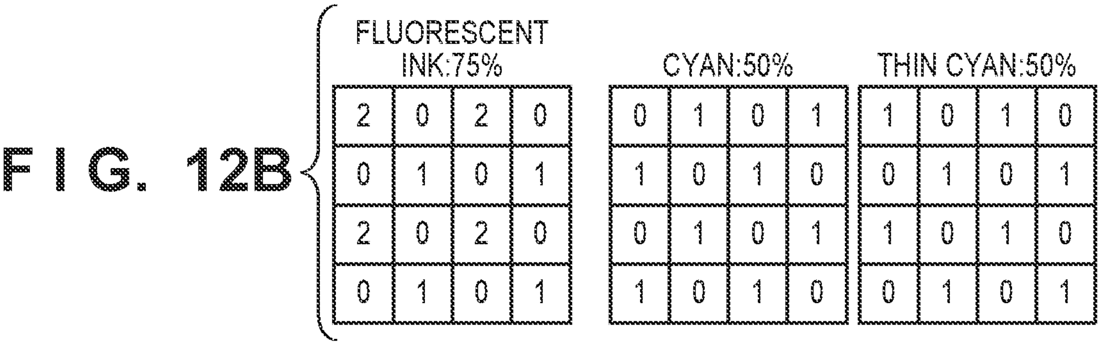

FIG. 12B is a view schematically showing the quantized values of fluorescent ink, cyan ink (thick cyan ink), and thin cyan ink when the fluorescent ink is 75% and the cyan ink is 75%. In this embodiment, a case in which the colorant concentration of the thin cyan ink is half that of the cyan ink will be explained. Since the colorant concentration of the thin cyan ink is half that of the cyan ink, an ejected dot count of 25% of the cyan ink is converted into an ejected dot count of 50% of the thin cyan ink. That is, a quantized value of 75% of the cyan ink shown in FIG. 12A is replaced with a quantized value of 50% of the cyan ink and a quantized value of 50% of the thin cyan ink shown in FIG. 12B. Then, the same processing as shown in FIG. 7 of the first embodiment is performed on fluorescent ink dots and cyan ink dots.

The dot arrangement of the fluorescent ink shown in FIG. 12B shows the result obtained by executing the processing shown in FIG. 7 on the fluorescent ink dots and the cyan ink dots. As shown in this fluorescent ink dot arrangement, the fluorescent ink dots do not overlap the cyan ink dots. On the other hand, the fluorescent ink dots overlap the thin cyan ink dots. However, the light absorptance of the thin cyan ink reduces compared to that of the cyan ink. Consequently, suppression of the light emission of the fluorescent ink caused by the subtractive mixture ink also reduces by half. In this embodiment, at least one dot of the dot count of the thick ink is converted into the dot count of thin ink as described above, thereby decreasing the number of pixels to which the thick ink is applied, and increasing the number of pixels to which the thin ink is applied. As a consequence, light emission suppression of fluorescent ink dots is reduced, and this makes it possible to suppress a steep color change of a multicolor of the fluorescent ink and the subtractive mixture ink.

As shown in FIG. 12B, when the colorant concentration of the thin cyan ink is half that of the cyan ink, the number of dots of the thin ink with respect to one dot of thick ink is 2. Note that dot count conversion can be changed in accordance with the colorant concentration difference between the cyan ink and the thin cyan ink. As the colorant concentration difference increases, the number of dots of the thin ink with respect to one dot of the thick ink increases. On the other hand, as the colorant concentration difference decreases, the number of dots of the thin ink with respect to one dot of the thick ink decreases. Even in this case, the same effects as those of the first and second embodiments can be achieved by replacing subtractive mixture ink dots with subtractive mixture ink dots having a high colorant concentration and subtractive mixture ink dots having a low colorant concentration, and controlling the landing positions of fluorescent ink dots with respect to the subtractive mixture ink having a high colorant concentration.

Fourth Embodiment

Differences of the fourth embodiment from the first to third embodiments will be explained below. In this embodiment, a dot arrangement is so controlled as to suppress a steep color change of a multicolor of thin ink and thick ink. Processing of this embodiment will be explained below with reference to FIG. 14.

Thick cyan ink and thin cyan ink absorb light in the same wavelength region. This is so because at least a portion of the absorption wavelength region of thin cyan ink falls within the range of the absorption wavelength region of thick cyan ink. Therefore, when performing printing by overlapping thick cyan ink and thin cyan ink, the thick cyan ink suppresses the absorption of light by the thin cyan ink. For this reason, the gentle color change in the thin cyan ink is suppressed. "Thin ink" herein mentioned represents ink having a low colorant concentration. Examples are light cyan (Lc) ink, light magenta (Lm) ink, and gray (Gy) ink. On the other hand, "thick ink" represents ink having a high colorant concentration. Examples are black (K) ink, cyan (C) ink, and magenta (M) ink.

Figure 14:
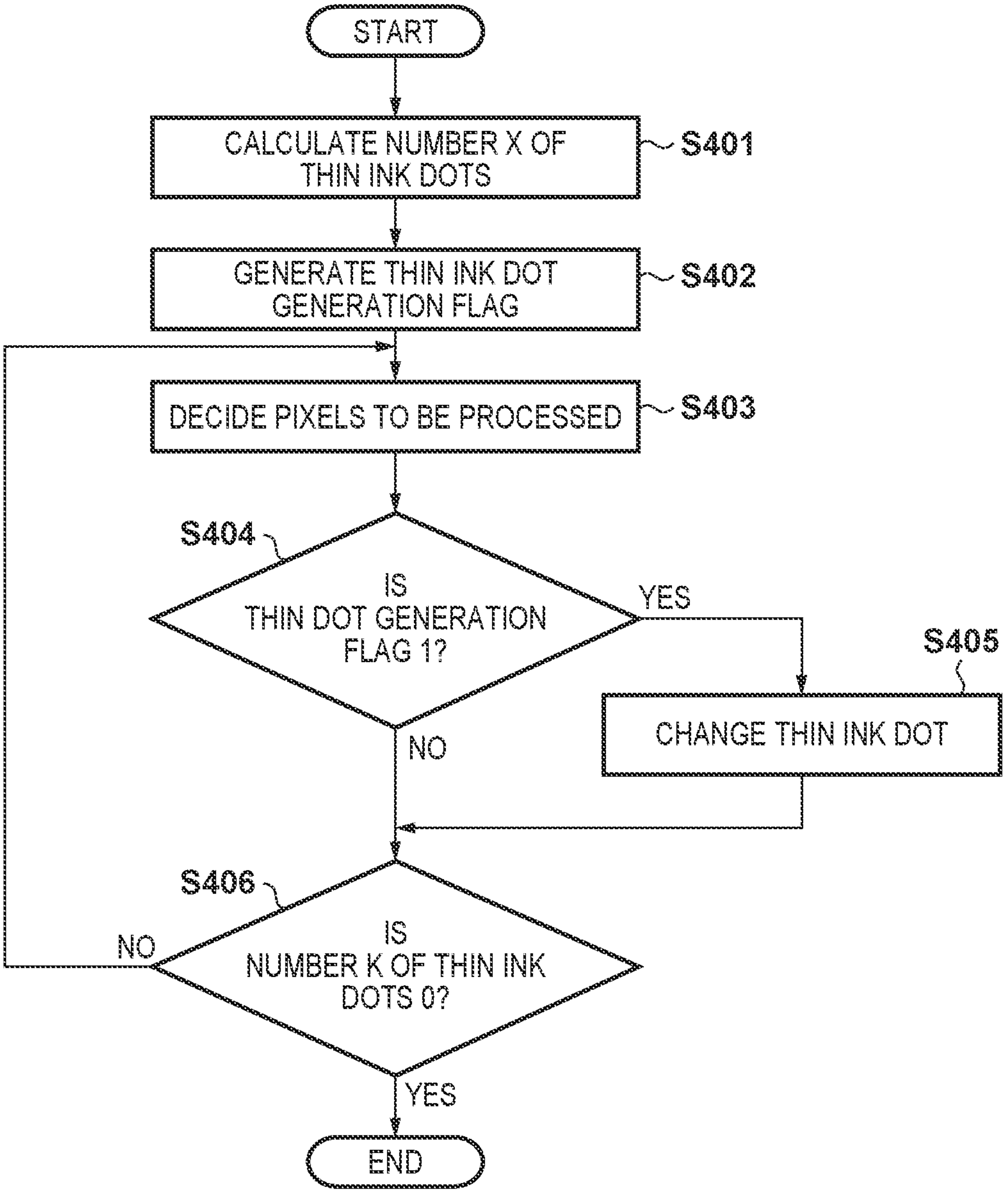
FIG. 14 is a flowchart showing a process of deciding the dot arrangement of thin ink.

FIG. 14 is a flowchart showing a process of deciding the dot arrangement of thin ink. This process shown in FIG. 14 can decide the dot arrangement of thin ink based on the dot arrangement of thick ink. In this embodiment, the dot arrangement is so decided that there are one or more pixels to which two or more thin ink dots are applied and there is no pixel to which both a thin ink dot and a thick ink dot are applied.

In S401, a CPU 111 calculates a number X of thin ink dots in a predetermined region from the quantization result in S104. In this embodiment, the case of a 4×4 pixel region will be explained in order to simplify the explanation.

The processing for fluorescent ink explained in the first embodiment is applied to thin ink in this embodiment, and the processing for cyan ink explained in the first embodiment is applied to thick ink in this embodiment. This embodiment will be explained below by using the fluorescent ink shown in FIGS. 8A to 8F as thin ink, and cyan ink as thick ink.

In S402, the CPU 111 generates a thin ink dot generation flag. That is, as in the first embodiment, "1" represents generation of a dot, and "0" represents generation of no dot. The thin ink dot generation flag is generated based on the thin ink amount shown in FIG. 8A, and the dot arrangement of thick ink. Referring to FIG. 8E, a pixel having a thin ink amount and containing no thick ink dot is "1", and other pixels are "0". The thin ink dot generation flag as shown in FIG. 8E is generated from the quantization result of thick ink dots shown in FIG. 8C and the thin ink amount shown in FIG. 8A.

In S403, the CPU 111 decides pixels to be processed in a 4×4 pixel region. The pixels to be processed are decided in ascending order of threshold values in the threshold mask shown in FIG. 8D. For example, in the case of FIG. 8D, a pixel corresponding to a threshold value "1" is decided first as a pixel to be processed. In S404, the CPU 111 determines whether the thin ink dot generation flag generated in S402 and corresponding to the pixel to be processed decided in S403 is "1". If it is determined that the thin ink dot generation flag is "1", that is, if there is a thin ink amount and no thick ink dot exists, the process advances to S405. On the other hand, if it is determined that the thin ink dot generation flag is not "1" but "0", the process advances to S406.

In S405, the CPU 111 changes the quantized value of the thin ink dot. This change of the quantized value is to add 1 to the quantized value of the pixel to be processed. Then, the CPU 111 subtracts 1 from the number X of thin ink dots. After S405, the process advances to S406.

In S406, the CPU 111 determines whether the number X of thin ink dots is 0. If it is determined that the number X of thin ink dots is 0, the CPU 111 terminates the processing in the 4×4 pixel region, and advances to the processing of a next 4×4 pixel region. For example, the CPU 111 executes the process shown in FIG. 14 on a 4×4 pixel region as a processing object adjacent to the 4×4 pixel region processed in FIG. 14. On the other hand, if it is determined that the number X of thin ink dots is not 0, the CPU 111 decides a next pixel to be processed in S403. That is, the CPU 111 decides a pixel corresponding to a threshold value "2" as a pixel to be processed. Then, the CPU 111 repeats the processing from S404.

By the abovementioned processing, control is so performed as to give a thin ink dot to a pixel position not overlapping a thick ink dot. Furthermore, a pixel position where a plurality of thin ink dots are applied to the same pixel is decided in ascending order of threshold values in the threshold mask. Accordingly, a position where a plurality of dots are applied can be decided while maintaining the blue noise characteristic of the threshold mask, so the granular feeling can be improved. Note that the pixel region is 4×4 in this embodiment, but the pixel region is not limited to this and need only be 2×2 or more.

In this embodiment as described above, a dot arrangement is decided so as not to give both a thin ink dot and a thick ink dot to the same pixel. This makes it possible to prevent thick ink from suppressing a gentle color change of thin ink. As a consequence, a steep color change of a multicolor of thin ink and thick ink can be suppressed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-044384, filed Mar. 18, 2022, which is hereby incorporated by reference herein in its entirety.

What is claimed is:

1. An information processing apparatus comprising:

an acquisition unit configured to acquire print data;

a generation unit configured to generate first ink data for performing printing by first ink, and second ink data for performing printing by second ink having a spectral characteristic different from a spectral characteristic of the first ink, based on the print data acquired by the acquisition unit; and a changing unit configured to change an arrangement of pixels which are decided from the first ink data and in which the first ink is printed and the number of dots of the first ink in each pixel, based on the arrangement of pixels which are decided from the first ink data and in which the first ink is printed, and an arrangement of pixels which are decided from the second ink data and in which the second ink is printed, wherein the changing unit changes the arrangement of pixels in which the first ink is printed, such that a pixel in which the first ink is printed and a pixel in which the second ink is printed do not overlap each other, and the changing unit changes the number of dots in each pixel of the first ink, such that the total number of dots of the first ink decided from the first ink data is maintained before and after the change by the changing unit, wherein the first ink is fluorescent ink, and the second ink is non-fluorescent ink, wherein, if the arrangement of pixels in which the second ink is printed and the number of dots of the second ink are converted into the arrangement of pixels in which thick ink is printed and the number of dots of the thick ink, and the arrangement of pixels in which thin ink is printed and the number of dots of the thin ink, the changing unit changes the arrangement of pixels in which the first ink is printed, such that the pixels in which the first ink is printed and the pixels in which the thick ink is printed do not overlap each other, and wherein the pixels in which the first ink is printed and the pixels in which the thin ink is printed can overlap each other.

2. The apparatus according to claim 1, wherein the total number of dots of the first ink is acquired from a quantized value of the first ink, which is obtained based on a threshold mask for a predetermined region including a plurality of pixels.

3. The apparatus according to claim 2, wherein the arrangement of pixels which are decided from the second ink data and in which the second ink is printed is acquired from a quantized value of the second ink in the predetermined region.

4. The apparatus according to claim 1, wherein the changing unit specifies a pixel where a pixel which is decided from the first ink data and in which the first ink is printed and a pixel which is decided from the second ink data and in which the second ink is printed overlap each other, and allocates the number of dots of the first ink corresponding to the specified pixel to pixels other than the specified pixel.

5. The apparatus according to claim 4, wherein if the specified pixel meets a condition, the changing unit decides the pixel as a pixel in which the first ink is printed.

6. The apparatus according to claim 5, wherein the condition is that the specified pixel is adjacent to a pixel in which the second ink is not printed.

7. An information processing apparatus comprising:

an acquisition unit configured to acquire print data;

a generation unit configured to generate first ink data for performing printing by first ink, and second ink data for performing printing by second ink having a spectral characteristic different from a spectral characteristic of the first ink, based on the print data acquired by the acquisition unit; and a changing unit configured to change an arrangement of pixels which are decided from the first ink data and in which the first ink is printed and the number of dots of the first ink in each pixel, based on the arrangement of pixels which are decided from the first ink data and in which the first ink is printed, and an arrangement of pixels which are decided from the second ink data and in which the second ink is printed, wherein the changing unit changes the arrangement of pixels in which the first ink is printed, such that a pixel in which the first ink is printed and a pixel in which the second ink is printed do not overlap each other, and the changing unit changes the number of dots in each pixel of the first ink, such that the total number of dots of the first ink decided from the first ink data is maintained before and after the change by the changing unit, wherein at least a portion of an emission wavelength region or an excitation wavelength region of the first ink falls within a range of an absorption wavelength region of the second ink.

8. The apparatus according to claim 1, further comprising a control unit configured to control a printing unit to perform printing on a print medium by using the first ink and the second ink, based on the arrangement of pixels in which the first ink is printed and the number of dots of the first ink in each pixel, which are changed by the changing unit.

9. An information processing apparatus comprising:

an acquisition unit configured to acquire print data;

a generation unit configured to generate first ink data for performing printing by first ink, and second ink data for performing printing by second ink having a spectral characteristic different from a spectral characteristic of the first ink, based on the print data acquired by the acquisition unit; and a changing unit configured to change an arrangement of pixels which are decided from the first ink data and in which the first ink is printed and the number of dots of the first ink in each pixel, based on the arrangement of pixels which are decided from the first ink data and in which the first ink is printed, and an arrangement of pixels which are decided from the second ink data and in which the second ink is printed, wherein the changing unit changes the arrangement of pixels in which the first ink is printed, such that a pixel in which the first ink is printed and a pixel in which the second ink is printed do not overlap each other, and the changing unit changes the number of dots in each pixel of the first ink, such that the total number of dots of the first ink decided from the first ink data is maintained before and after the change by the changing unit, wherein at least a portion of an absorption wavelength region of the first ink falls within a range of an absorption wavelength region of the second ink.

10. An information processing apparatus comprising:

an acquisition unit configured to acquire print data;

a generation unit configured to generate first ink data for performing printing by first ink, and second ink data for performing printing by second ink having a spectral characteristic different from a spectral characteristic of the first ink, based on the print data acquired by the acquisition unit; and a changing unit configured to change an arrangement of pixels which are decided from the first ink data and in which the first ink is printed and the number of dots of the first ink in each pixel, based on the arrangement of pixels which are decided from the first ink data and in which the first ink is printed, and an arrangement of pixels which are decided from the second ink data and in which the second ink is printed, wherein the changing unit changes the arrangement of pixels in which the first ink is printed, such that a pixel in which the first ink is printed and a pixel in which the second ink is printed do not overlap each other, and the changing unit changes the number of dots in each pixel of the first ink, such that the total number of dots of the first ink decided from the first ink data is maintained before and after the change by the changing unit, wherein the first ink is thin ink, and the second ink is thick ink.

11. A method comprising:

acquiring print data;

generating first ink data for performing printing by first ink, and second ink data for performing printing by second ink having a spectral characteristic different from a spectral characteristic of the first ink, based on the acquired print data; and changing an arrangement of pixels which are decided from the first ink data and in which the first ink is printed and the number of dots of the first ink in each pixel, based on the arrangement of pixels which are decided from the first ink data and in which the first ink is printed, and an arrangement of pixels which are decided from the second ink data and in which the second ink is printed, wherein the arrangement of pixels in which the first ink is printed is changed such that a pixel in which the first ink is printed and a pixel in which the second ink is printed do not overlap each other, and the number of dots in each pixel of the first ink is changed such that the total number of dots of the first ink decided from the first ink data is maintained before and after the change, wherein the first ink is fluorescent ink, and the second ink is non- fluorescent ink, wherein, if the arrangement of pixels in which the second ink is printed and the number of dots of the second ink are converted into the arrangement of pixels in which thick ink is printed and the number of dots of the thick ink, and the arrangement of pixels in which thin ink is printed and the number of dots of the thin ink, the changing changes the arrangement of pixels in which the first ink is printed, such that the pixels in which the first ink is printed and the pixels in which the thick ink is printed do not overlap each other. and wherein the pixels in which the first ink is printed and the pixels in which the thin ink is printed can overlap each other.

12. A non-transitory computer-readable storage medium storing a program configured to cause a computer to function to:

acquire print data;

generate first ink data for performing printing by first ink, and second ink data for performing printing by second ink having a spectral characteristic different from a spectral characteristic of the first ink, based on the acquired print data; and change an arrangement of pixels which are decided from the first ink data and in which the first ink is printed and the number of dots of the first ink in each pixel, based on the arrangement of pixels which are decided from the first ink data and in which the first ink is printed, and an arrangement of pixels which are decided from the second ink data and in which the second ink is printed, wherein the arrangement of pixels in which the first ink is printed is changed such that a pixel in which the first ink is printed and a pixel in which the second ink is printed do not overlap each other, and the number of dots in each pixel of the first ink is changed such that the total number of dots of the first ink decided from the first ink data is maintained before and after the change, wherein the first ink is fluorescent ink, and the second ink is non- fluorescent ink, wherein, if the arrangement of pixels in which the second ink is printed and the number of dots of the second ink are converted into the arrangement of pixels in which thick ink is printed and the number of dots of the thick ink, and the arrangement of pixels in which thin ink is printed and the number of dots of the thin ink, the change changes the arrangement of pixels in which the first ink is printed, such that the pixels in which the first ink is printed and the pixels in which the thick ink is printed do not overlap each other, and wherein the pixels in which the first ink is printed and the pixels in which the thin ink is printed can overlap each other.

* * * * *